US005750235A

United States Patent [19]

Yoshimasa

[11] Patent Number: 5,750,235

[45] Date of Patent: May 12, 1998

[54] BASE BOARD FOR LAYERED CORRUGATED FIBERBOARD STRUCTURE

[75] Inventor: Yokoyama Yoshimasa, Hyohgo, Japan

[73] Assignees: Yokoyama Sankoh Co., Ltd.; Hitachi Zosen Corporation, both of Japan

[21] Appl. No.: 737,417

[22] PCT Filed: May 18, 1995

[86] PCT No.: PCT/JP95/00959

§ 371 Date: Nov. 12, 1996

§ 102(e) Date: Nov. 12, 1996

[87] PCT Pub. No.: WO95/31330

PCT Pub. Date: Nov. 23, 1995

[30] Foreign Application Priority Data

May 18, 1994 [JP] Japan .................................... 6-103602
Dec. 27, 1994 [JP] Japan .................................... 6-324591

[51] Int. Cl.$^6$ .................................................... B32B 3/28

[52] U.S. Cl. ............................ 428/182; 428/43; 428/134; 428/138; 428/155; 428/167; 428/184; 428/186; 428/212

[58] Field of Search ................................ 428/43, 59, 131, 428/134, 137, 138, 155, 167, 182, 184, 186, 192, 212

[56] References Cited

U.S. PATENT DOCUMENTS 2,503,874 4/1950 Ives ........................................ 428/182

*Primary Examiner*—Donald Loney

*Attorney, Agent, or Firm*—Lorusso & Loud

[57] ABSTRACT

A base board for a layered corrugated fiberboard structure comprises a corrugated fiberboard material including a corrugating medium having flutes, first folds along which the corrugated fiberboard material is folded in the shape of the inverted letter V, and second folds along which the corrugated fiberboard material is folded in the shape of the letter V, and the first folds and the second folds are formed in the corrugated fiberboard material in parallel to each other and in an alternate arrangement so as to extend perpendicularly or at an angle other than a right angle to the flutes. The second folds are lines of perforations, and portions of the corrugated fiberboard material that forms an outer surface when folded are incised along the lines of perforations. Otherwise, the second folds may be formed by alternately arranging hinge portions, which have a predetermined length and are formed by crushing portions of the flutes of the corrugated fiberboard material, and cut portions or slits, which penetrate the corrugated fiberboard material, in portions of the corrugated fiberboard material in which the second folds are to be formed. The first and second folds are smoothly and surely formed by a pressing machine which works on one side of the corrugated fiberboard material.

47 Claims, 36 Drawing Sheets

BASE BOARD FOR LAYERED CORRUGATED FIBERBOARD STRUCTURE

TECHNICAL FIELD

This invention relates to a base board for a layered corrugated fiberboard structure (corrugated fiberboard block) of a predetermined shape, capable of being accurately and easily folded in layers and of being easily handled when fabricating the layered corrugated fiberboard structure by folding a corrugated fiberboard or a corrugating medium having flutes (hereinafter referred to as "corrugated fiberboard material").

Such a layered corrugated fiberboard structure is used for forming cushioning materials, packing spacers, packaging pads, packages, fillers for building materials or pallets, heat insulating boards and gas filter elements.

BACKGROUND ART

Proposed in Japanese Patent Laid-open No. 6-227567 is, for example, a corrugated fiberboard cushioning material (base board for a layered corrugated fiberboard structure) fabricated by forming convex folds (folds having the shape of an inverted letter V) and concave folds (folds having the shape of a letter V) in parallel to each other in an alternate arrangement in a rectangular double-faced corrugated fiberboard.

The convex fold of the cushioning material is formed by cutting the component member of the double-faced corrugated fiberboard other than its inner linerboard that forms the inner surface when the double-faced corrugated fiberboard is folded.

On the other hand, the concave fold is formed by cutting through a plurality of portion (two or more portions) of the double-faced corrugated fiberboard, while leaving short unincised portions so that portions on the outer side of the short unincised portions are divided when the double-faced corrugated fiberboard is folded. Therefore, the resultant double-faced corrugated fiberboard is shaped such that only one of the linerboard portions is continuous in the short unincised portions in the concave folds.

More concretely, the convex folds and the concave folds are formed by pressing a press cutter on one surface of the double-faced corrugated fiberboard to cut portions of the double-faced corrugated fiberboard, in which the folds are to be formed, as described above, and folding the portions for the convex folds in a convex shape, while folding the portions for the concave folds in a concave shape.

The concave folds are formed by the foregoing method, because press cutters need to be pressed on the opposite surfaces of the double-faced corrugated fiberboard when the concave folds are formed similarly to the convex folds by cutting portions of the double-faced corrugated fiberboard other than the inner linerboard that forms the inner surface when the double-faced corrugated fiberboard is folded. Namely, an apparatus that presses the press cutters on the opposite surfaces of the double-wall corrugated fiberboard has a complicated construction, is expensive and operates at a very low processing speed and a low productivity.

The prior art base board for a layered corrugated fiberboard structure has the following disadvantages.

One of the disadvantages is that since only one of the linerboard portions is continuous in the short unincised portions in the concave folds, portions corresponding to the concave folds of the corrugated fiberboard are very weak, the corrugated fiberboard is apart along the folds during use and, consequently, the corrugated fiberboard cannot be reused.

Another disadvantage is that if the length of the short unincised portions of the concave folds is increased to strengthen the portions corresponding to the concave folds, portions of the corrugated fiberboard on the outer side of the concave folds are not broken along the concave folds when the corrugated fiberboard is folded along the concave folds, fissures are formed across the concave folds in boundaries between the unincised portions and the incised portions, and the corrugated fiberboard cannot accurately be folded along the concave folds by a mechanical means.

Accordingly, it is an object of the present invention to overcome the above disadvantages of the prior art base board for a layered corrugated fiberboard structure and to provide a base board for a layered corrugated fiberboard structure which is provided with sufficiently strong concave folds, i.e., folds to be folded in the shape of the letter V, and will not be broken along the concave folds during handling.

Another object of the present invention is to provide a base board for a layered corrugated fiberboard structure which is capable of being accurately folded by a mechanical means.

DISCLOSURE OF THE INVENTION

According to the present invention, a base board for a layered corrugated fiberboard structure comprises a corrugated fiberboard material including a corrugating medium having flutes, wherein first folds along which the corrugated fiberboard material is folded in the shape of an inverted letter V and second folds along which the corrugated fiberboard material is folded in the shape of a letter V are formed on the corrugated fiberboard material in parallel to each other in an alternate arrangement so as to extend perpendicularly or at an angle other than a right angle to the flutes.

According to the present invention, in order to attain the above objects, the second folds are formed as follows.

In a base board for a layered corrugated fiberboard structure defined in claim 1, the second folds are lines of perforations, and portions of the corrugated fiberboard material that forms the outer surface when folded are incised along the lines of perforations.

The portions of the corrugated fiberboard material that forms the outer surface when folded is broken along the lines of perforations by applying a bending pressure to the corrugated fiberboard material such as to fold the corrugated fiberboard material in the shape of the letter V along the lines of perforations. When the bending pressure is applied to the corrugated fiberboard material in this manner, the portions of the corrugated fiberboard material that forms the outer surface when folded is easily broken all at once along the lines of perforations.

According to a base board for a layered corrugated fiberboard structure defined in claim 2, the second folds are formed by alternately arranging hinge portions, which have a predetermined length and are formed by crushing portions of the flutes of the corrugated fiberboard material, and cut portions, which penetrate the corrugated fiberboard material, along portions of the corrugated fiberboard material in which the second folds are to be formed. Further, auxiliary cut portions penetrating the corrugated fiberboard material and intersecting the cut portions at a predetermined angle are formed on the opposite sides of the opposite ends of the cut portions.

According to a base board for a layered corrugated fiberboard structure defined in claim 3, the second folds are formed by alternately arranging hinge portions, which have a predetermined length and are formed by crushing portions of the flutes of the corrugated fiberboard material, and slits, which have a width smaller than the thickness of the corrugated fiberboard material and penetrate the corrugated fiberboard material, along portions of the corrugated fiberboard material in which the second folds are to be formed. Further, auxiliary cut portions penetrating the corrugated fiberboard material and intersecting the slits at a predetermined angle are formed on the opposite sides of the opposite ends of the slits.

According to a base board for a layered corrugated fiberboard structure defined in claim 4, the second folds are formed by alternately arranging hinge portions, which have a predetermined length and are formed by crushing portions of the flutes of the corrugated fiberboard material, and slits, which have a width greater than the thickness of the corrugated fiberboard material and penetrate the corrugated fiberboard material, along portions of the corrugated fiberboard material in which the second folds are to be formed.

According to a base board for a layered corrugated fiberboard structure defined in claim 5, in the invention defined in claim 4, the opposite ends of the slits in the cross direction are tapered toward the hinge portions.

According to a base board for a layered corrugated fiberboard structure defined in claim 6, the second folds are formed by arranging grooves, which have a substantially quadrangular cross section of a width about twice the thickness of the corrugated fiberboard, in the surface of the corrugated fiberboard material that forms the inner surface when the corrugated fiberboard material is folded.

According to a base board for a layered corrugated fiberboard structure defined in claim 7, in the invention defined in claim 6, each of the grooves forming the second folds has opposite side surfaces formed by cutting the corrugated fiberboard material in the thickness direction, and a bottom surface formed by crushing a portion of the corrugated fiberboard material between the opposite side surfaces.

The first folds of each foregoing base board for the layered corrugated fiberboard structure according to the present invention may be similar in constitution to the foregoing second folds or be formed in the following shapes according to the type of the corrugated fiberboard material.

As defined in claim 8, when the corrugated fiberboard material is a corrugating medium having flutes, the first folds may be formed by cutting portions of the corrugated fiberboard material other than the hinge portions formed to be continuous to flute tip portions which extend on the side of the corrugated fiberboard material that forms the inner surface when the corrugated fiberboard material is folded.

As defined in claim 9, when the corrugated fiberboard material is a single-faced corrugated fiberboard, the first folds may be formed by cutting portions of the corrugated fiberboard material other than at least the linerboard portions of the corrugated fiberboard material or hinge portions formed to be continuous to flute tip portions which are not covered with the linerboard.

As defined in claim 10, when the corrugated fiberboard material is a double-faced corrugated fiberboard, a double-wall corrugated fiberboard or a triple-wall corrugated fiberboard, the first folds may be formed by cutting portions of the corrugated fiberboard material other than at least the hinge portions formed to be continuous to a linerboard on the side of the corrugated fiberboard material that forms the inner surface when the corrugated fiberboard material is folded.

As mentioned above, the first folds and the second folds are easily formed by pressing a press cutter against one surface of the corrugated fiberboard material.

According to the present invention, when the corrugated fiberboard material has flutes extending along the length direction thereof or flutes inclined at an angle other than a right angle to the length direction thereof, the folds are formed along the cross direction of the corrugated fiberboard material.

The foregoing corrugated fiberboard material may be provided with openings at suitable positions according to the purpose of a layered corrugated fiberboard structure thus fabricated.

The width of the foregoing corrugated fiberboard material may vary from portion to portion or may be fixed according to the purpose of a layered corrugated fiberboard structure.

The folds of the foregoing corrugated fiberboard material may be arranged at equal intervals or at irregular intervals according to the purpose of the base board for the layered corrugated fiberboard structure.

The corrugated fiberboard material used for the base board for the layered corrugated fiberboard structure in accordance with the present invention may be an ordinary corrugating medium having flutes or an ordinary corrugated fiberboard, and may be, when necessary, a water-proofed or reinforced corrugating medium having flutes or a water-proofed or reinforced corrugated fiberboard.

According to the present invention, there is no particular restriction on the planar shape of the corrugated fiberboard material. The planar shape of the corrugated fiberboard material is dependent on the purpose and place of use of a layered corrugated fiberboard structure formed by folding the corrugated fiberboard material. Namely, the corrugated fiberboard material is designed in a planar shape suitable for the shape and the construction of a layered corrugated fiberboard structure to be fabricated.

A layered corrugated fiberboard structure of a predetermined shape is formed by folding the foregoing base board for the layered corrugated fiberboard structure along the folds in a zigzag shape.

In such a layered corrugated fiberboard structure, the adjacent layers are bonded with an adhesive. Otherwise, the adjacent layers need not be bonded according to the purpose or the final state of use.

When the layered corrugated fiberboard structure is fabricated by using each foregoing base board for the layered corrugated fiberboard structure, and the folds are formed so as to perpendicularly intersect the flutes of the corrugated fiberboard material, the tips of the flutes of the adjacent layers of the layered corrugated fiberboard structure overlap directly or indirectly. Accordingly, the layered corrugated fiberboard structure assumes the shape of a honeycomb structure having holes extending along the flutes of the layers (when the corrugated fiberboard material is a corrugating medium) or a pseudo honeycomb structure (when the corrugated fiberboard material is a single-faced corrugated fiberboard or a double-faced corrugated fiberboard). Since the flutes in the layers of the layered corrugated fiberboard structure extend in a fixed direction, the layered corrugated fiberboard structure has the highest strength against an external force acting thereon in the direction of extension of the flutes.

On the other hand, when the folds are formed so as to intersect the flutes of the corrugated fiberboard material at an angle other than a right angle, the flutes in the adjacent layers of the layered corrugated fiberboard structure fabricated by using such a base board for the layered corrugated fiberboard structure intersect each other at a predetermined angle, and the angle of intersection is uniform through out the layered corrugated fiberboard structure. Accordingly, this layered corrugated fiberboard structure is strong against external forces other than an external force that acts thereon in a direction perpendicular to a plane including the layers.

Since the base board for the layered corrugated fiberboard structure is thus constructed, the base board is not only folded in layers for transportation and storage but also transported and stored without being folded.

When the base board for the layered corrugated fiberboard structure defined in claim 1 is folded along the folds in a zigzag shape to form the layered corrugated fiberboard structure, the surface of the layered corrugated fiberboard structure on which the second folds are broken is exposed on the side of the layered corrugated fiberboard structure in which the second folds appear. Thus, a honeycomb or a pseudo honeycomb end structure is formed. Since portions corresponding to the second folds on the inner side when folded form hinges intermittently arranged at small intervals, the base board is strong enough to be reused.

When the base board for the layered corrugated fiberboard structure defined in claim 2 is folded along the folds in a zigzag shape to form the layered corrugated fiberboard structure, cut end surface of the corrugated fiberboard material is exposed in portions corresponding to the cut portions forming the second folds on the side of the layered corrugated fiberboard structure in which the second folds appear. The cut end surface protrudes slightly from a plane including the hinge portions of the second folds.

When the base board for the layered corrugated fiberboard structure is folded in the shape of the letter V along the second folds; the hinge portions of the second folds are folded in a cross section of a shape substantially resembling a circular arc, and the hinge portions are strong enough to be reused.

Since portions cut along the auxiliary cut portions formed on the boundary between the hinge portions of the second holds and the cut portions are raised, boundary portions between the hinge portions and the cut portions are not torn, and hence, the corrugated fiberboard material is smoothly and accurately folded.

When the base board for the layered corrugated fiberboard structure defined in claim 3 is folded along the folds in a zigzag shape to form the layered corrugated fiberboard structure, the cut end surface of the corrugated fiberboard material is exposed in portions provided with the slits of the second folds of the layered corrugated fiberboard structure at least on the side in which the second folds appear. The cut end surface and the hinge portions of the second folds are substantially on the same level.

When the base board for the layered corrugated fiberboard structure is folded in the shape of the letter V along the second folds, the surfaces of the hinge portions of the second folds are folded in a cross section of a shape substantially resembling a circular arc, and hence, the hinge portions are strong enough to be reused.

Since the auxiliary cut portions are formed in boundary portions between the hinge portions of the second folds and the slits, the boundary portions are not torn, and hence, the corrugated fiberboard material is smoothly and accurately folded.

When the base board for the layered corrugated fiberboard structure defined in claim 4 is folded along the folds to form the layered corrugated fiberboard structure, the cut end surface of the corrugated fiberboard material is exposed in portions provided with the slits of the second folds of the layered corrugated fiberboard structure on the side in which the second folds appear. The cut end surface is below a plane including the hinge portions of the second folds.

The surfaces of the hinge portions of the second folds are folded in a cross section of a shape substantially resembling a circular arc. Other functions are the same as those of the base board for the layered corrugated fiberboard structure defined in claim 3.

When the base board for the layered corrugated fiberboard structure defined in claim 5 is folded along the folds, the hinge portions of the second folds are folded about the tapered portions of the opposite ends of the slits forming the second folds of the layered corrugated fiberboard structure in a cross section substantially resembling a circular arc. Thus, the tapered end portions of the slits guide the hinge portions for folding.

In the base board for the layered corrugated fiberboard structure defined in claim 6, the second folds are the grooves of a quadrangular cross section having a width about twice the thickness of the corrugated fiberboard material. Therefore, when the base board for the layered corrugated fiberboard structure defined in claim 6 is folded along the second folds to form the layered corrugated fiberboard structure, portions which appear on the outer side of the second folds have a substantially quadrangular cross section and does not have the shape of a circular arc. The second folds are strong enough to be reused.

In the base board for the layered corrugated fiberboard structure defined in claim 7, the grooves forming the second folds in the base board defined in claim 6 have the opposite side surfaces formed by cutting the corrugated fiberboard material by half the thickness of the corrugated fiberboard material and the bottom surface formed by crushing a portion between the opposite side surfaces. Therefore, the grooves have an accurately quadrangular cross section.

When the base board for the layered corrugated fiberboard structure defined in any one of claims 8 to 10 is folded along the folds in a zigzag shape, the end surfaces of the cut portions of the first folds are exposed on the side of the layered corrugated fiberboard structure in which the first folds appear. On the other hand, the surface of the layered corrugated fiberboard structure in which the second folds appear has the same structure as that of the base board for the layered corrugated fiberboard structure defined in any one of claims 1 to 7.

When a base board like the base board for the layered corrugated fiberboard structure defined in claim 12, is provided with openings at suitable positions of the corrugated fiberboard material, the positions, the shape and the size of the openings are determined properly. Hollow layered corrugated fiberboard structures and layered corrugated fiberboard structures having recesses in their surfaces are fabricated by folding this base board for the layered corrugated fiberboard structure.

When a layered corrugated fiberboard structure is formed by folding a corrugated fiberboard material having a width varying in each portion in the length direction, like the base board for the layered corrugated fiberboard structure defined in claim 13, a varying pattern of the width of the corrugated fiberboard material is properly determined. Then, a layered corrugated fiberboard structure having desired protrusions and recesses in one of or both of its side surfaces is formed by folding this base board for the layered corrugated fiberboard structure.

When the folds are arranged at substantially equal intervals like the base board for the layered corrugated fiberboard structure defined in claim 14, a layered corrugated fiberboard structure having a substantially quadrangular cross section is formed by folding this base board for the layered corrugated fiberboard structure.

When the holds are arranged at irregular intervals like the base board for the layered corrugated fiberboard structure defined in claim 15, the varying pattern of the intervals between the folds is properly selected. Then, a layered corrugated fiberboard structure having desired protrusions and recesses in one of or both of its surfaces extending in the direction of folding is formed by folding this base board for the layered corrugated fiberboard structure.

BEST MODE FOR CARRYING OUT THE INVENTION

First Embodiment

Figure 1:
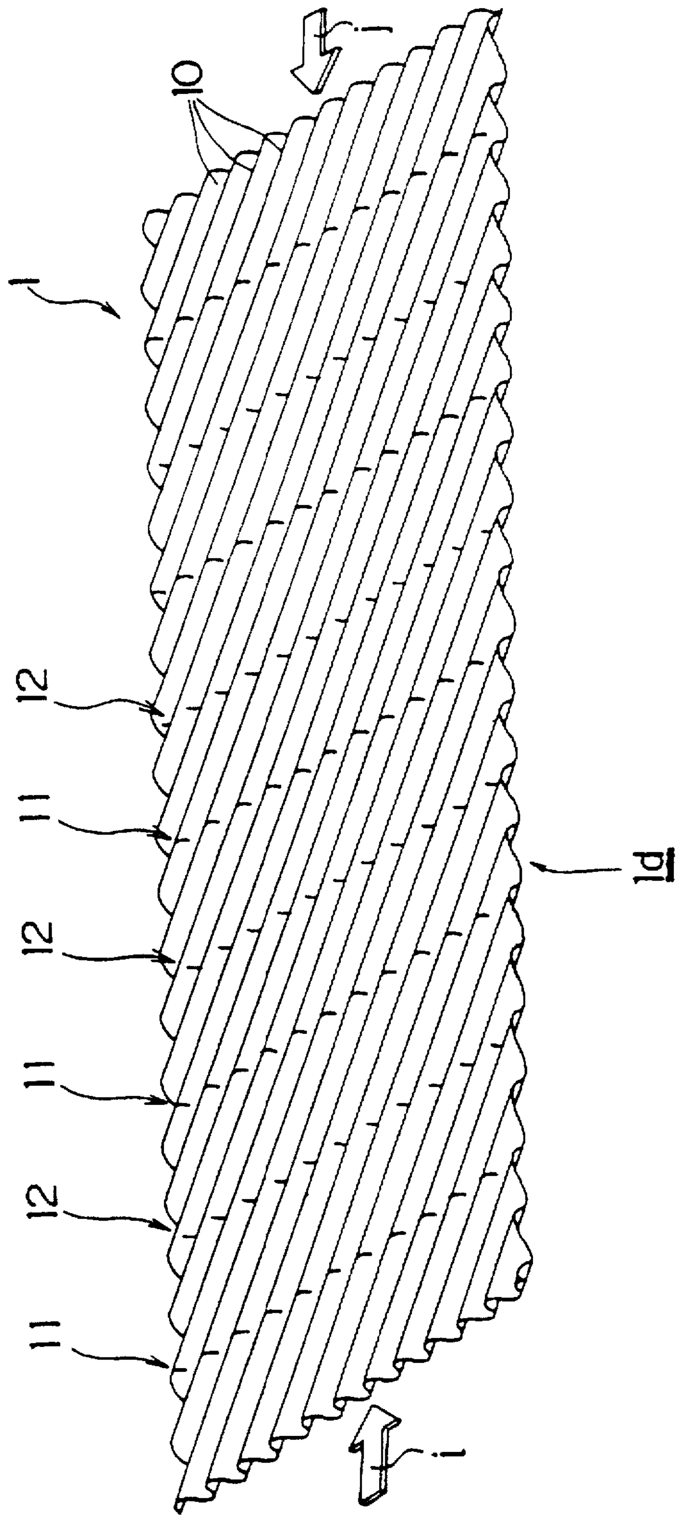
FIG. 1 is a perspective view of a base board for a layered corrugated fiberboard structure in a first embodiment according to the present invention.

Referring to FIG. 1, a corrugated fiberboard material 1 for forming a base board **1*d* for a layered corrugated fiberboard structure is a corrugating medium of a fixed width having a plurality of flutes 10 extending at an angle other than a right angle (about 350° in this embodiment) to the length of the corrugated fiberboard material 1**.

A plurality of first folds 11 along which the corrugated fiberboard material 1 is folded in the shape of an inverted letter V and a plurality of second folds 12 along which the corrugated fiberboard material 1 is folded in the shape of the letter V are formed so as to extend in the cross direction of the corrugated fiberboard material 1 at an angle other than a right angle to the flutes 10 and in parallel to each other at fixed intervals in an alternate arrangement.

Figure 3:
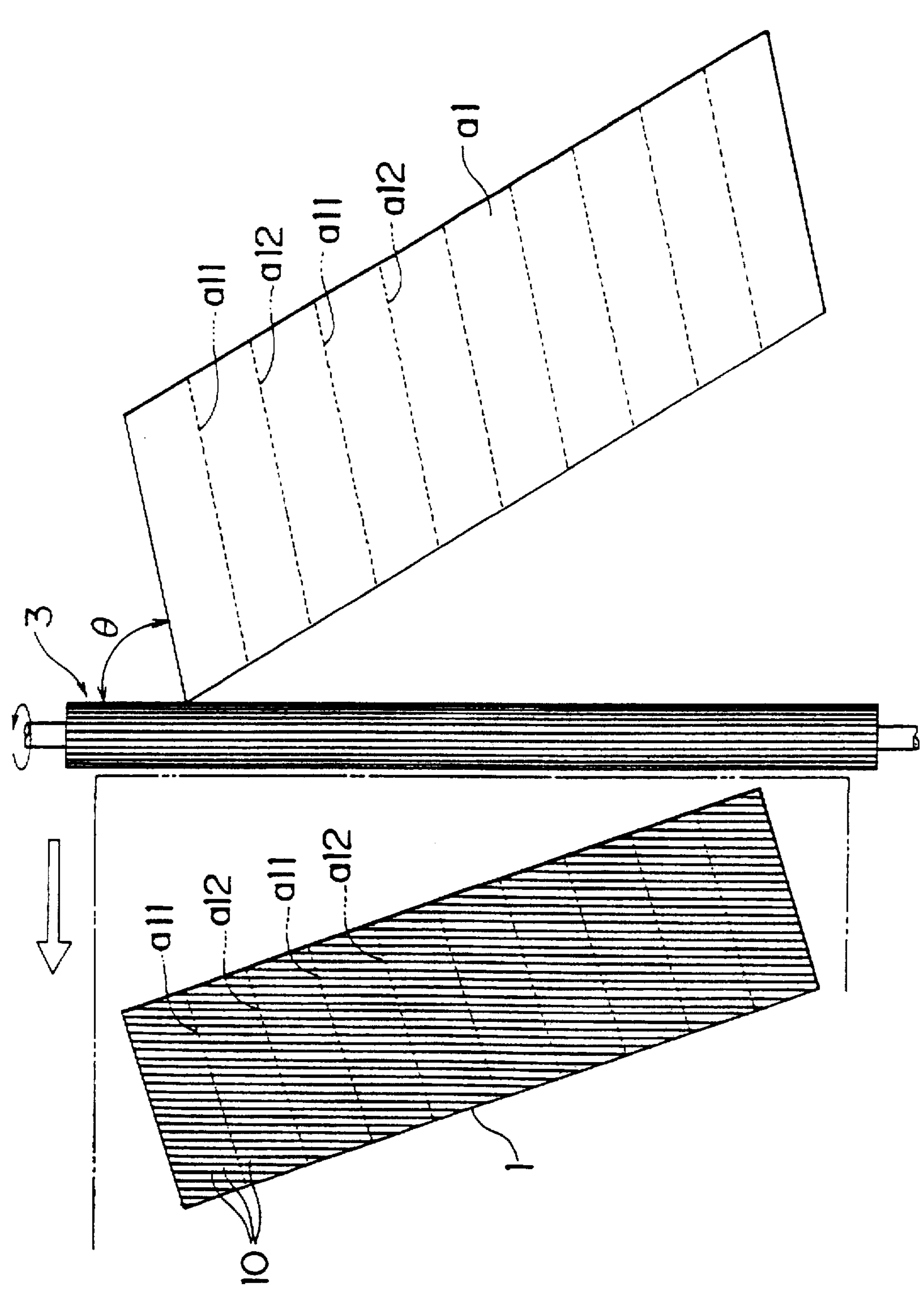
FIG. 3 is a plan view for explaining a process of manufacturing the base board for the layered corrugated fiberboard structure of FIG. 1.

FIG. 3 shows an embodiment of an apparatus for manufacturing the base board id for a layered corrugated fiberboard structure in the first embodiment.

First, perforations a11 and a12 are continuously formed in a corrugating medium, not shown, in parallel to the length of the corrugating medium at fixed intervals while the corrugating medium is being delivered by mill rolls, not shown, and then, the corrugating medium is cut along lines oblique to the cross direction of the corrugating medium at predetermined intervals to produce a substantially parallelogrammatic perforated corrugating medium piece al.

Then, the perforated corrugating medium piece al is fed to a pair of corrugating rolls 3 with its width inclined at a predetermined insertion angleθ to the nip line of the pair of corrugating rolls 3 to form the plurality of flutes 10 in the perforated corrugating medium piece al to obtain the corrugated fiberboard material 1.

The direction and amount of contraction of the base board due to the formation of the flutes 10 are calculated so that the corrugated fiberboard material 1 thus provided with the oblique flutes 10 has a substantially rectangular shape and the lines of the perforations a11 and a12 extend along the cross direction, and the planar shape and dimensions of the perforated corrugating medium piece al before the formation of the flutes 10 are determined.

As mentioned above, a bending pressure is applied from below to portions, in which the perforations all are formed, of the corrugated fiberboard material 1 provided with the oblique flutes 10 to fold the corrugated fiberboard material 1 in the shape of the inverted letter V along the portions in which the perforations a11 are formed, and a bending pressure is applied from above to portions, in which the perforations a12 are formed, of the corrugated fiberboard material 1 to fold the corrugated fiberboard material 1 in the shape of the letter V along the portions in which the perforations a12 are formed.

Figure 2:
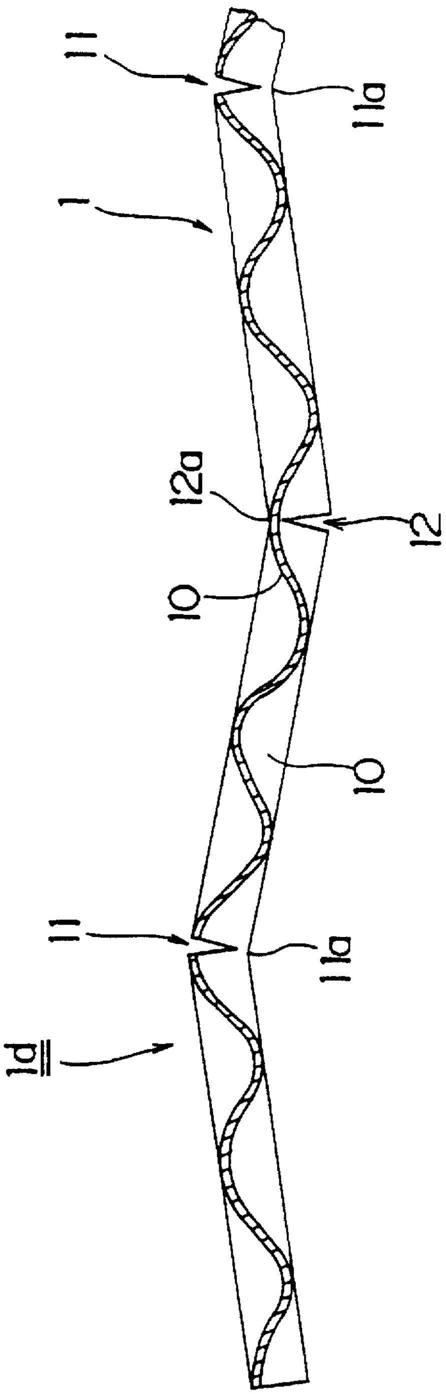
FIG. 2 is an enlarged fragmentary sectional view of the base board for the layered corrugated fiberboard structure of FIG. 1.

As shown in FIG. 2, when the bending pressures are thus applied to the corrugated fiberboard material 1, hinge portions **11*a* are formed at intervals in portions of the corrugated fiberboard material 1 that forms an inner surface (lower side) when the corrugated fiberboard material 1 is fold along the lines of the perforations all shown in FIG. 3, and portions of the corrugated fiberboard material 1 that forms an outer surface (upper side) when the corrugated fiberboard material is folded are broken to form first folds along which the corrugated fiberboard material 1 is to be folded in the shape of the inverted letter V. On the other hand, hinge portions 12*a* are formed at intervals in portions of the corrugated fiberboard material 1 that forms an inner surface (upper side) when the corrugated fiberboard material 1 is folded as shown in FIG. 2 along the lines of the perforations a12 shown in FIG. 3, and portions of the corrugated fiberboard material 1 that forms an outer surface (lower side) when the corrugated fiberboard material is folded are broken to form second folds along which the corrugated fiberboard material 1** is folded in the shape of the letter V.

Figure 4A:
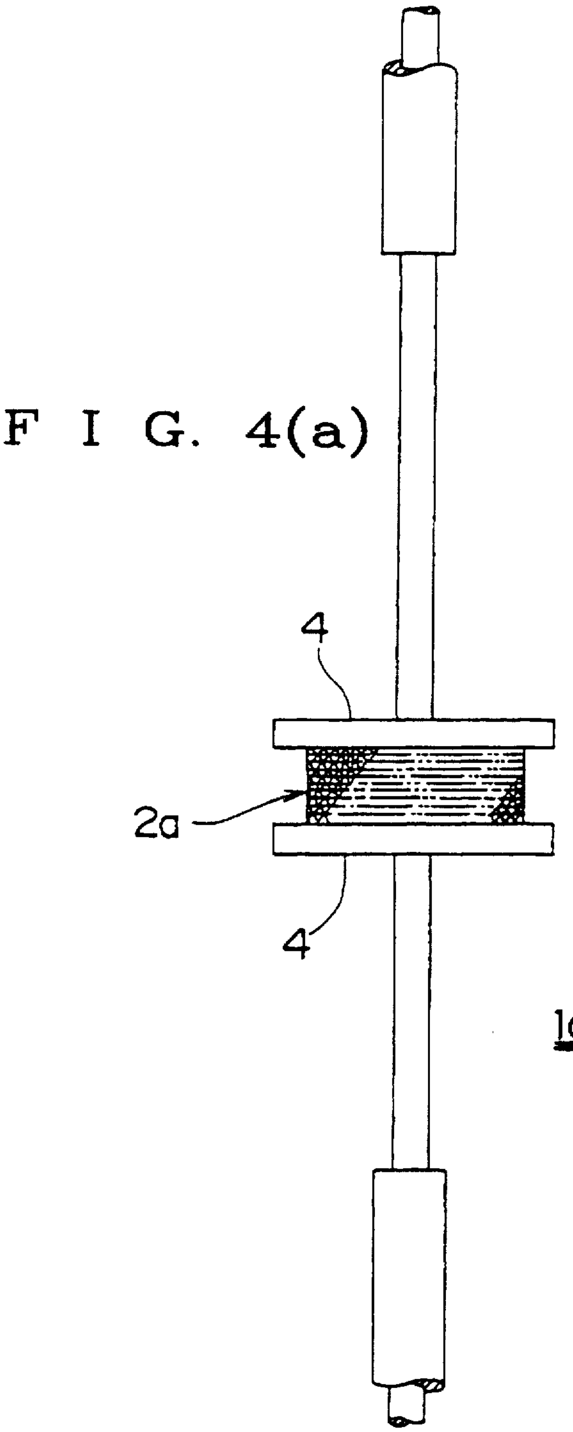
FIGS. 4(*a*) and 4(*b*) are plan views of the base board for the layered corrugated fiberboard structure of FIG. 1 before and after folding, respectively.
Figure 4B:
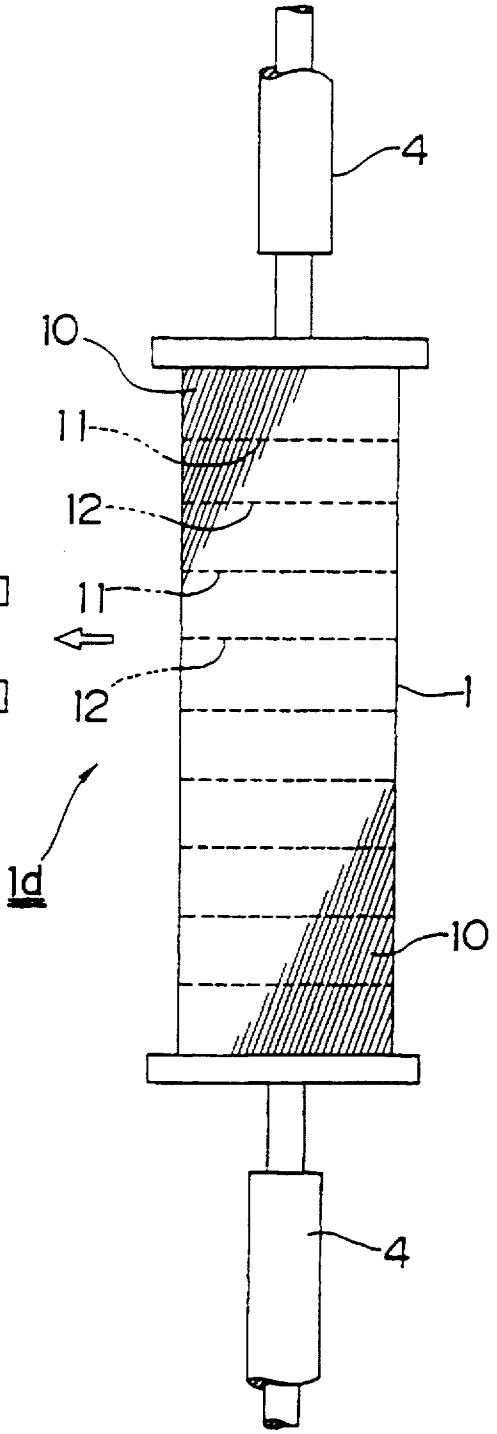

Folding mechanisms 4 including, for instance, pneumatic cylinders as shown in FIG. 4(*a*) are installed after the apparatus for manufacturing the base board **1*d* on the opposite sides of the production line. The base board 1*d* for the layered corrugated fiberboard structure is folded in a zigzag shape when compressed longitudinally by the folding mechanisms 4, and a layered corrugated fiberboard structure 2*a* as shown in FIGS. 4**(*b*) and 5 is formed.

Figure 5:
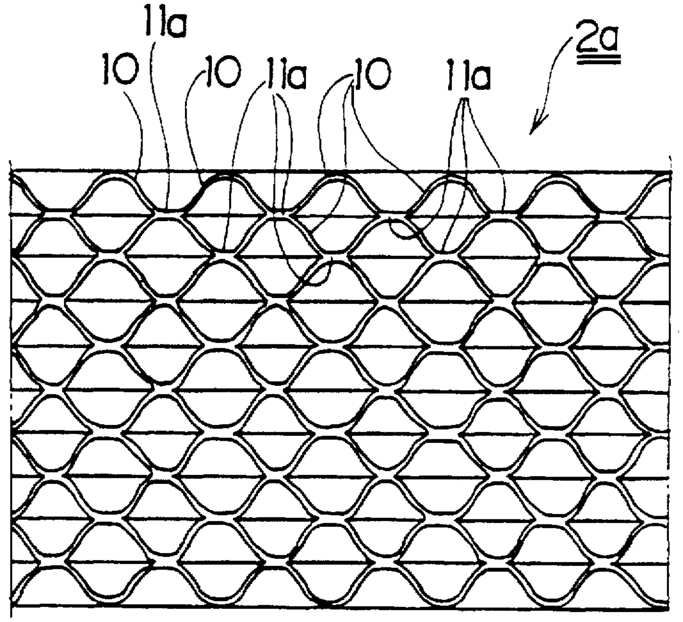
FIG. 5 is an enlarged fragmentary plan view of a layered corrugated fiberboard structure formed by folding the base board for the layered corrugated fiberboard structure of FIG. 1 in a zigzag shape.

As shown in FIG. 5, in the layered corrugated fiberboard structure **2*a*, the flutes 10 of the adjacent layers intersect each other at a uniform intersection angle, and the layered corrugated fiberboard structure 2*a* has honeycomb upper and lower end surfaces. More perfectly honeycomb upper and lower end surfaces are formed when the intersection angle between the folds 11 and 12 and the flutes 10** are closer to a right angle.

The layers of the layered corrugated fiberboard structure **2*a* shown in FIG. 5 may be bonded together when necessary. When the layered corrugated fiberboard structure 2*a* are used at high speed transversely by other members, the layers of the layered corrugated fiberboard structure 2*a*** need not be bonded together.

As mentioned above, since the base board **1*d* for the layered corrugated fiberboard structure in this embodiment is provided with the first folds 11 and the second folds 12 extending parallel to each other in an alternate arrangement and facing in opposite directions such that the first and second folds intersect the flutes 10 at an angle other than a right angle, the layered corrugated fiberboard structure is very easily formed so as to intersect the flutes 10 of the adjacent layers each other at a uniform intersection angle by applying an external force to the folds 11 and 12** in folding directions.

Since base board **1*d* for the layered corrugated fiberboard structure is continuous in portions corresponding to the folds 11 and 12, and is handled in an unfolded state as shown in FIG. 1 before folding the same to fabricate the layered corrugated fiberboard structure, the base board 1*d*** is easy to handle for transportation and storage, and is very easily and automatically handled by an automatic packing system for feeding or the like.

Since the flutes 10 of the adjacent layers of the layered corrugated fiberboard structure 2a intersect each other at a fixed intersection angle, the layered corrugated fiberboard structure 2a is strong against external forces that act in directions perpendicular to an end surface shown in FIG. 5 and transverse forces, as viewed in FIG. 5. Thus, the layered corrugated fiberboard structure 2a is suitable for use as a core material for a heat insulating board exposed to such external forces and spacers required to be strong against such external forces.

Since the flutes 10 of the adjacent layers of the layered corrugated fiberboard structure 2a intersect each other, and holes defined by the flutes 10 of the adjacent layers communicate with each other with respect to a transverse direction, the layered corrugated fiberboard structure 2a is suitable for use as a gas filter element.

Since the layered corrugated fiberboard structure 2a is capable of being elastically compressed to some extent by an external force that acts vertically, as viewed in FIG. 5, on the layered corrugated fiberboard structure 2a, the layered corrugated fiberboard structure 2a is suitable for use as elastic cushioning members, packing spacers and packaging pads.

The base board 1d for the layered corrugated fiberboard structure in this embodiment is formed also by obliquely cutting a corrugating medium having flutes formed in the corrugating medium so as to extend along the cross direction in a rectangular shape, and forming folds like the foregoing folds 11 and 12 in a corrugated fiberboard material obtained by cutting the corrugating medium.

The corrugated fiberboard material 1 for forming the base board for the layered corrugated fiberboard structure in the first embodiment may be a single-faced corrugated fiberboard, a double-faced corrugated fiberboard or a double-wall corrugated fiberboard.

Second Embodiment

Figure 6:
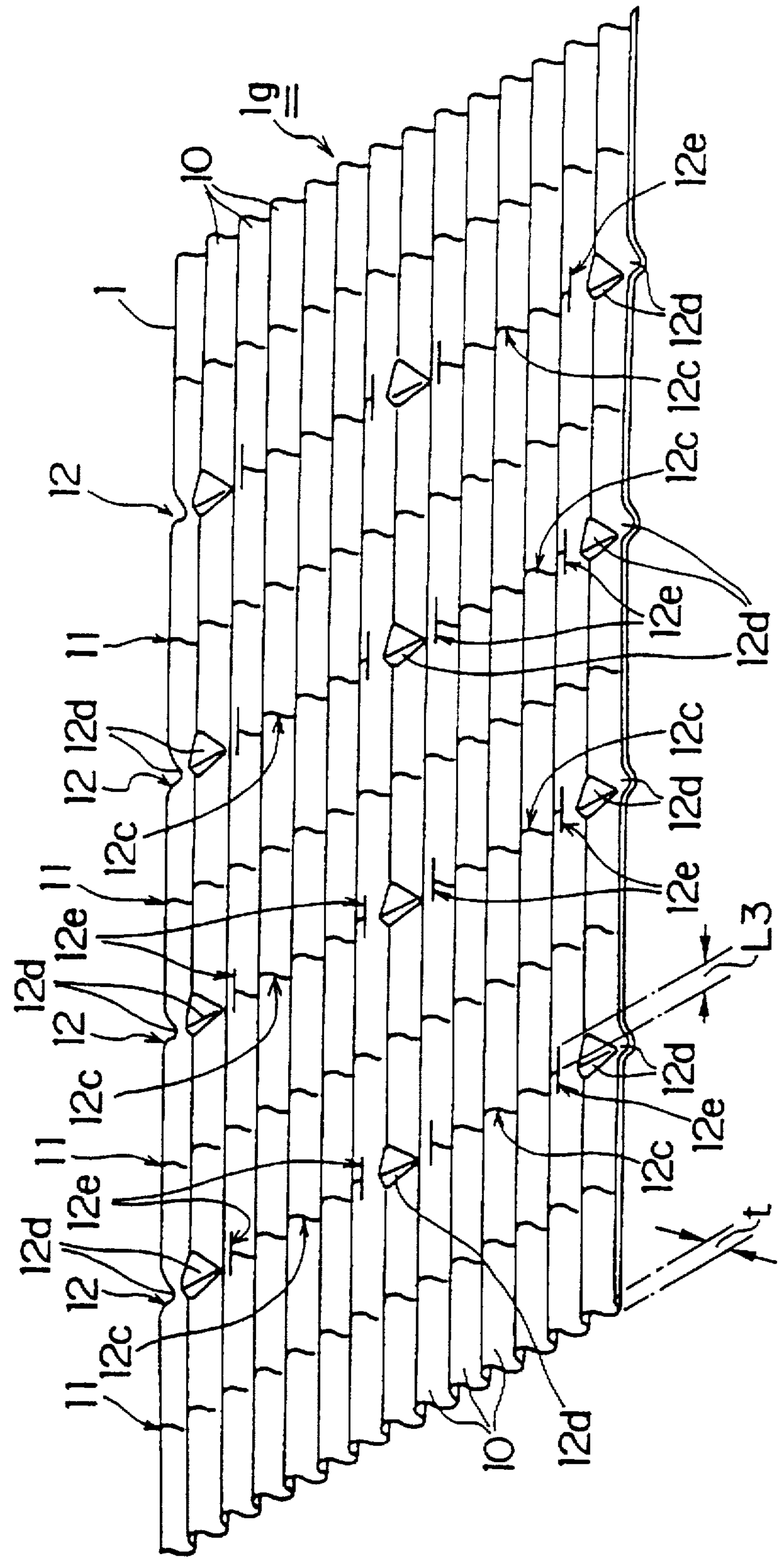
FIG. 6 is a perspective view of a base board for a layered corrugated fiberboard structure in another embodiment according to the present invention.
Figure 7:
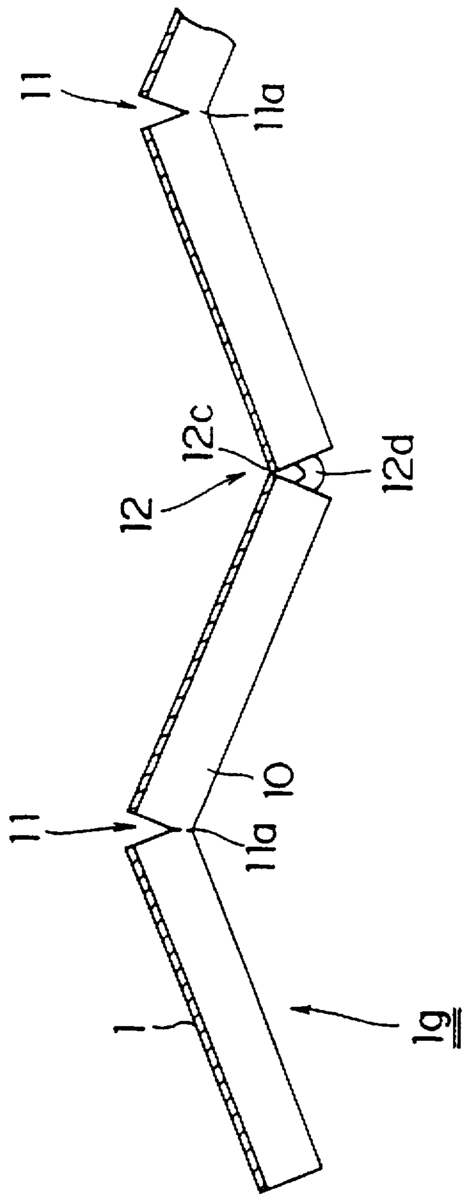
FIG. 7 is an enlarged, fragmentary sectional view of the base board for the layered corrugated fiberboard structure of FIG. 6 at an initial stage of folding in a zigzag shape.

FIGS. 6 and 7 show a base board 1g for a layered corrugated fiberboard structure in a second embodiment according to the present invention. A corrugated fiberboard material 1 for forming the base board 1g for the layered corrugated fiberboard structure is a corrugating medium having flutes 10 extending in parallel in the length direction. The corrugated fiberboard material 1 is manufactured by forming the flutes 10 a corrugating medium along the cross direction of the corrugating medium while the corrugating medium is being delivered by corrugating rolls, not shown, and then cutting the corrugating medium at fixed intervals.

A plurality of first folds 11 along which the corrugated fiberboard material 1 is folded in the shape of an inverted letter V and a plurality of second folds 12 along which the corrugated fiberboard material 1 is folded in the shape of a letter V are formed so as to extend perpendicularly to the flutes 10 and along the cross direction of the corrugated fiberboard material at fixed intervals in an alternate arrangement.

As shown in FIG. 7, the first folds 11 are formed by cutting portions of the corrugated fiberboard material 1 other than hinge potions 11a formed to be continuous to tip portions of the flutes on the lower surface of the corrugated fiberboard material 1 (i.e., the bottom of the flutes 10 in the illustrated embodiment). When a bending force is applied in a specific direction to the portions of the corrugated fiberboard material 1 corresponding to the first folds 11, the corrugated fiberboard material 1 is folded.

The second folds 12 have hinge portions 12d, which have a predetermined length and are formed by crushing portions of the flutes of the corrugated fiberboard material 1, and cut portions 12c, which are longer than the hinge portions 12d and formed by cutting through portions of the corrugated fiberboard material 1. The hinge portions 12d and the cut portions 12c are arranged alternately in a line.

Auxiliary cut portions 12e penetrating the corrugated fiberboard material 1 are formed substantially perpendicularly to the cut portions 12c at the opposite sides of the opposite ends of the cut portions 12c.

When a bending force is applied in a specific direction to the portions of the corrugated fiberboard material 1 corresponding to the second folds 12, the corrugated fiberboard material 1 is folded in the shape of the letter V.

The distance L3 between each end of the auxiliary cutting line 12e and the point of intersection of the cut portion 12c and the auxiliary cut portion 12e is slightly greater than the thickness t of the corrugated fiberboard material 1.

Figure 8:
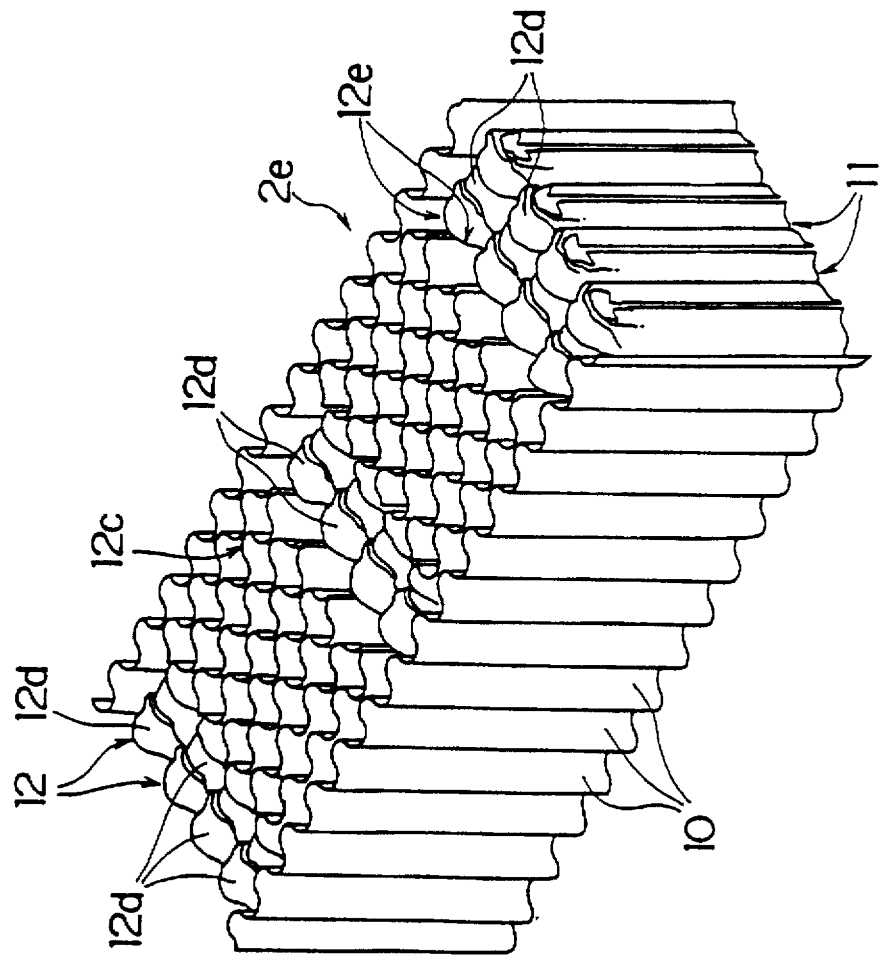
FIG. 8 is an enlarged perspective view of a layered corrugated fiberboard structure in an inverted position formed by folding the base board for the layered corrugated fiberboard structure of FIG. 6.

When the base board 1g for the layered corrugated fiberboard structure in this embodiment is compressed transversely, as viewed in FIG. 6, by folding mechanisms, not shown, the first folds 11 move up and the second folds 12 move down as shown in FIG. 7, so that the base board 1g is folded in a layered corrugated fiberboard structure 2e shown in FIG. 8.

When the corrugated fiberboard material 1 is folded along the second folds 12, portions of the corrugated fiberboard material 1 provided with the cut portions 12c and the auxiliary cut portions 12e are separated from the hinge portions 12d and raised, so that portions of the corrugated fiberboard material 1 corresponding to boundaries between the cut portions 12c and the hinge portions 12d may not be torn.

A honeycomb-shaped end surface defined by the cut ends corresponding to the first folds 11 is formed in one end of the layered corrugated fiberboard structure 2e, and a honeycomb-shaped end surface defined by the cut portions 12c of the second folds 12 and a plurality of alternate protrusions and recesses of the shape of a circular arc formed by the hinge portions 12d are formed in the other end surface of the layered corrugated fiberboard structure 2e. The honeycomb-shaped surface defined by the cut portions 12c protrudes slightly from a plane including the hinge portions 12d.

The layered corrugated fiberboard structure 2e has an internal honeycomb structure consisting of the butting flutes 10 of the adjacent layers. Accordingly, the layered corrugated fiberboard structure 2e is strong against a force that acts thereon perpendicularly to the honeycomb-shaped end surface, and hence, the layered corrugated fiberboard structure 2e is suitable for use as cores for heat insulating boards to be exposed to such an external force and spacers required to be strong against such an external force. Furthermore, since the layered corrugated fiberboard structure 2e is able to hold an absorbent or an adsorbent in the spaces of the honeycomb structure, the same is suitable for use as a gas filter element.

Since the layered corrugated fiberboard structure 2e is capable of being elastically deformed by an external force that acts on the surface thereof to which the flutes 10 are exposed, the layered corrugated fiberboard structure 2e is suitable for use as elastic cushioning members, packing spacers and packaging pads.

The folds 11 and 12 of this embodiment are formed by the following method.

The folds 11, the cut portions 12c and 12e and the hinge portions 12d are formed simultaneously in the corrugated fiberboard material 1 by a press machine, not shown, provided with cutting blades for forming the folds 11 and the cut portions 12c and 12e, and a pressing block and a die (wooden die) for forming the hinge portions 12d.

Then, the directivity for folding is given to the corrugated fiberboard material 1 so that the corrugated fiberboard material 1 may fold in the shape of the letter V along the folds 12.

The cutting blades and the pressing block of the press machine may be lowered from above the corrugated fiberboard material 1 for working or may be raised from below the corrugated fiberboard material 1. The cutting blades and the pressing block may be moved for working in the same direction.

In the base board 1*g* for the layered corrugated fiberboard structure in this embodiment, the folds 11 and 12, along which portions of the corrugated fiberboard material 1 are folded in opposite directions, respectively, are formed in the corrugated fiberboard material 1 with the cutting blades and the pressing block which move for working in the same direction. Therefore, the folds 11 and 12 are formed by a press machine provided with a cutting blade and included in ordinary corrugated fiberboard processing equipment by using the cutting blades and pressing block instead of the cutting blade belonging to the press machine. Thus, the processing of the corrugated fiberboard material 1 does not need any special press machine, so that equipment costs are reduced.

Other functions and effects of the base board 1*g* for the layered corrugated fiberboard structure in the second embodiment are substantially the same as those of the base board 1*d* in the first embodiment.

The corrugated fiberboard material 1 of the base board 1*g* for the layered corrugated fiberboard structure in the second embodiment may be substituted by a corrugating medium having oblique flutes 10, similarly to the first embodiment.

Third Embodiment

Figure 9:
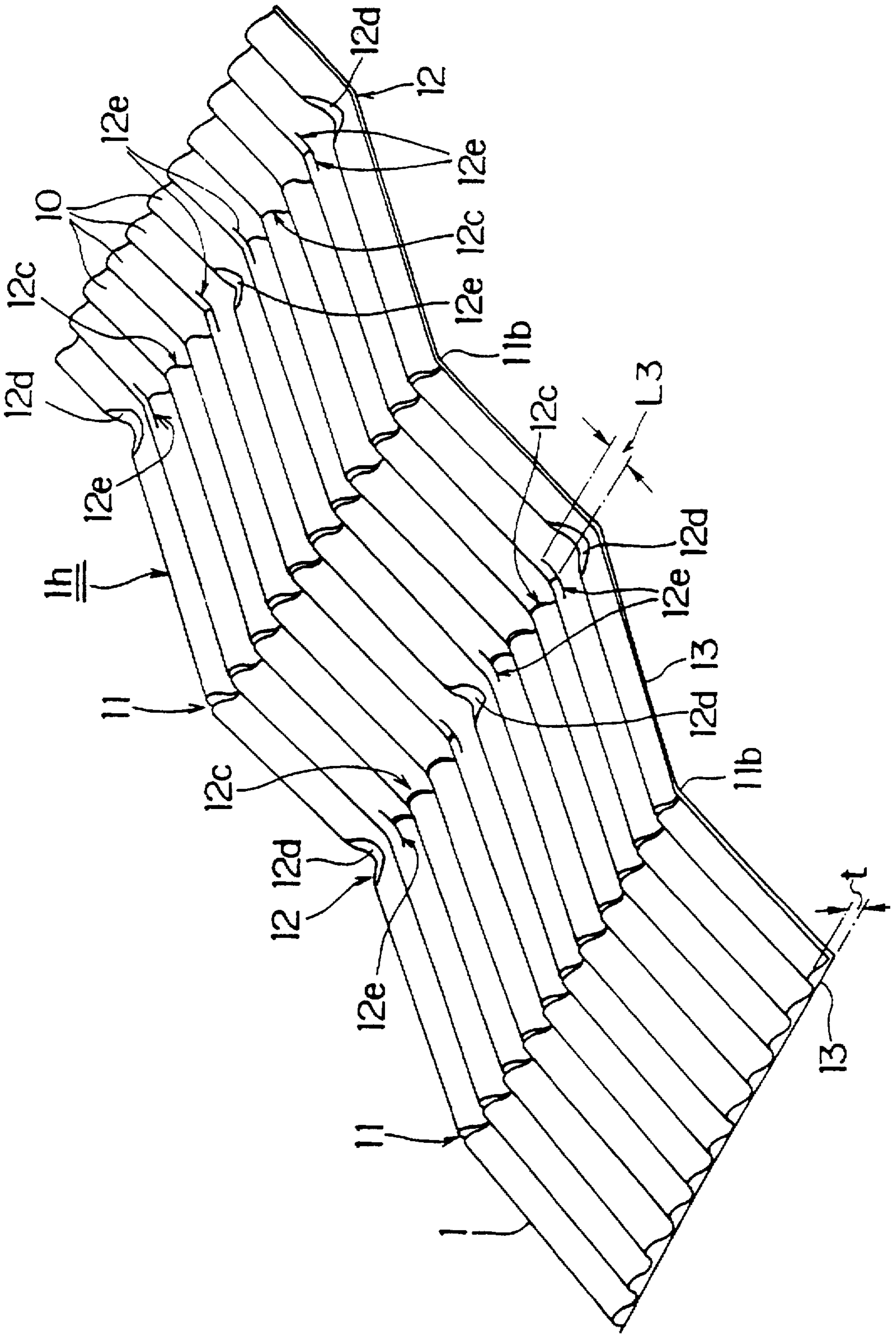
FIG. 9 is a fragmentary perspective view of a base board for a layered corrugated fiberboard structure in a further embodiment according to the present invention.

FIG. 9 shows a base board 1*h* for a layered corrugated fiberboard structure in a third embodiment according to the present invention.

A corrugated fiberboard material 1 for forming the base board for the layered corrugated fiberboard structure is a single-faced corrugated fiberboard having a plurality of longitudinal flutes 10. The corrugated fiberboard material 1 is manufactured by continuously producing a single-faced corrugated fiberboard provided with flutes 10 extending in the cross direction of a corrugating medium by a single-facer, not shown, and cutting the single-faced corrugated fiberboard at predetermined intervals while the single-faced corrugated fiberboard is being delivered.

Among folds 11 and 12 formed in the corrugated fiberboard material 1, the first folds 11 along which the corrugated fiberboard material 1 is folded in the shape of the inverted letter V are formed by cutting portions of the corrugated fiberboard material 1 other than hinge portions 11*b* formed to be continuous to the tip portions of the flutes 10 on the lower surface side (i.e., the bottom of the flutes 10), and a linerboard 13 on the lower surface of the corrugated fiberboard material 1.

On the other hand, the second folds 12 are substantially the same as the folds 12 of the base board 1*g* for the layered corrugated fiberboard structure in the second embodiment.

Therefore the detailed description thereof will be omitted.

When a layered corrugated fiberboard structure, not shown, is fabricated by folding the base board 1*h* for the layered corrugated fiberboard structure in this embodiment in a state shown in FIG. 9, the layered corrugated fiberboard structure has a honeycomb upper end surface, and a lower end surface substantially similar to the upper end surface of a layered corrugated fiberboard structure 2*f* shown in FIG. 12, which will be described later.

The functions and effects of the base board 1*h* for the layered corrugated fiberboard structure in this embodiment are substantially the same as the base board 1*g* for the layered corrugated fiberboard structure in the second embodiment, and hence, the description thereof will be omitted. The base board 1*h* differs from the base board 1*g* only in that the base board 1*h* has the linerboard 13.

Fourth Embodiment

Figure 10:
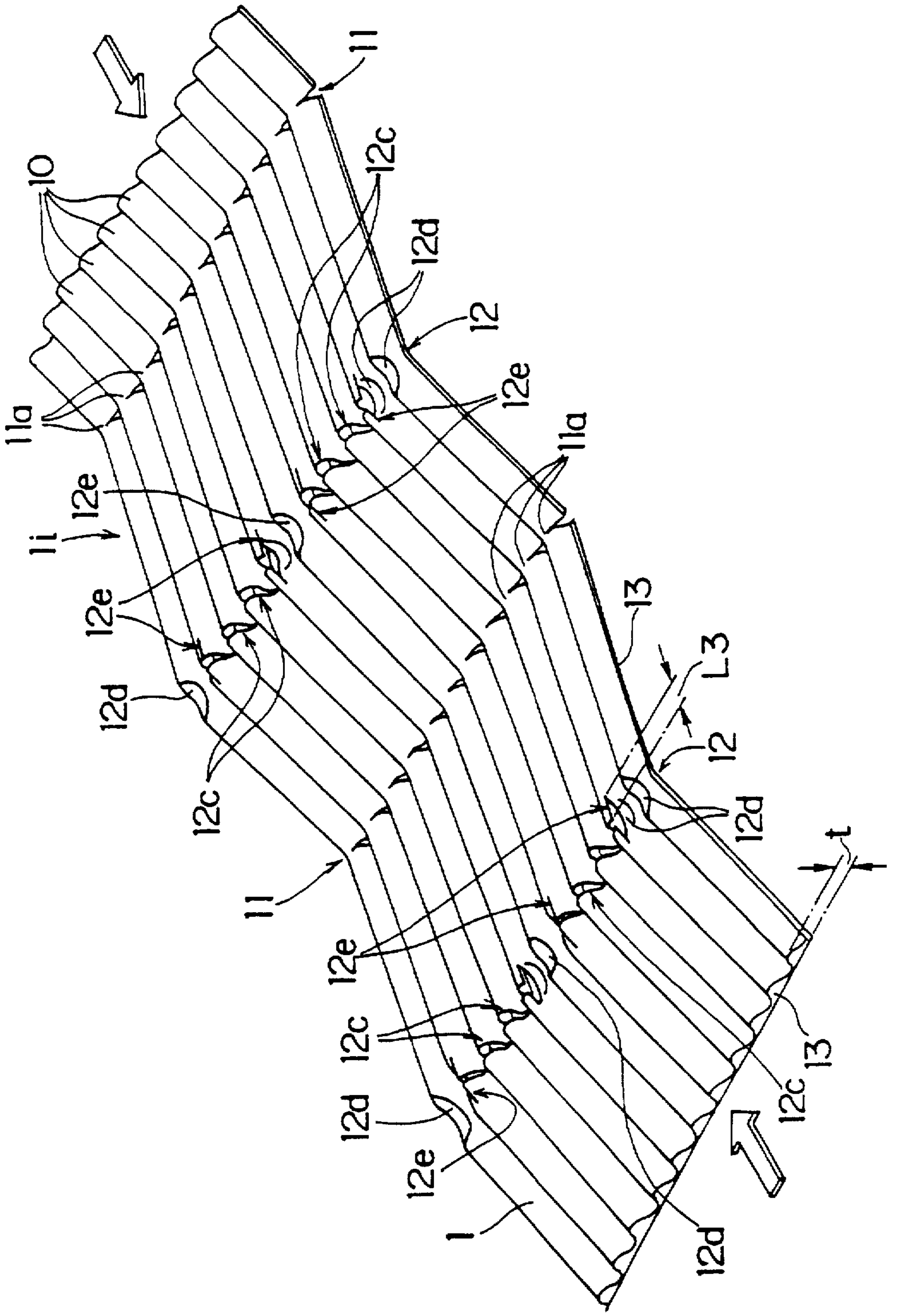
FIG. 10 is a fragmentary perspective view of a base board for a layered corrugated fiberboard structure in still further embodiment according to the present invention in a position with the back surface facing up.

FIG. 10 show a base board 1*i* for a layered corrugated fiberboard structure in a fourth embodiment according to the present invention. FIG. 10 is a fragmentary perspective view showing the base board 1*i* which is placed with its upper surface facing down.

The base board 1*i* for the layered corrugated fiberboard structure in this embodiment is a modification of the base board 1*h* for the layered corrugated fiberboard structure in the third embodiment.

First folds 11 along which the corrugated fiberboard material 1 is folded in the shape of the letter V, as viewed in FIG. 10, are formed by cutting portions of the corrugated fiberboard 1, which is a single-faced corrugated fiberboard, other than hinge portions 11*a* formed to be continuous to the tip portions of the flutes 10 on the side, to which the linerboard 13 is not bonded.

Second folds 12 along which the corrugated fiberboard material 1 is folded in the shape of the inverted letter V, similarly to those of the first embodiment, are formed by hinge portions 12*d* and cut portions 12*c* having auxiliary cut portions 12*e* perpendicularly joined to the opposite ends thereof and formed in an alternate arrangement on lines. The directivity for folding is given to the second folds 12 so that the corrugated fiberboard material 1 is folded in the shape of the inverted letter V along the second folds 12 in the illustrated state.

In each of the base boards 1*h* and 1*i* for the layered corrugated fiberboard structure in the third and fourth embodiments, the corrugated fiberboard material 1 may be a single-faced corrugated fiberboard having flutes 10 oblique to the length.

When a layered corrugated fiberboard structure, not shown, is fabricated by folding the base board 1*i* in the fourth embodiment in a zigzag shape as shown in FIG. 10, the layered corrugated fiberboard structure has an upper end surface similar to the upper end surface of the layered corrugated fiberboard structure 2*e* of FIG. 8, and a honeycomb lower end surface.

Other respects of the constitution, functions and effects of the base board 1*i* for the layered corrugated fiberboard structure in this embodiment are substantially the same as those of the base board 1*g* for the layered corrugated fiberboard structure in the second embodiment and hence, the description thereof will be omitted.

Fifth Embodiment

Figure 11:
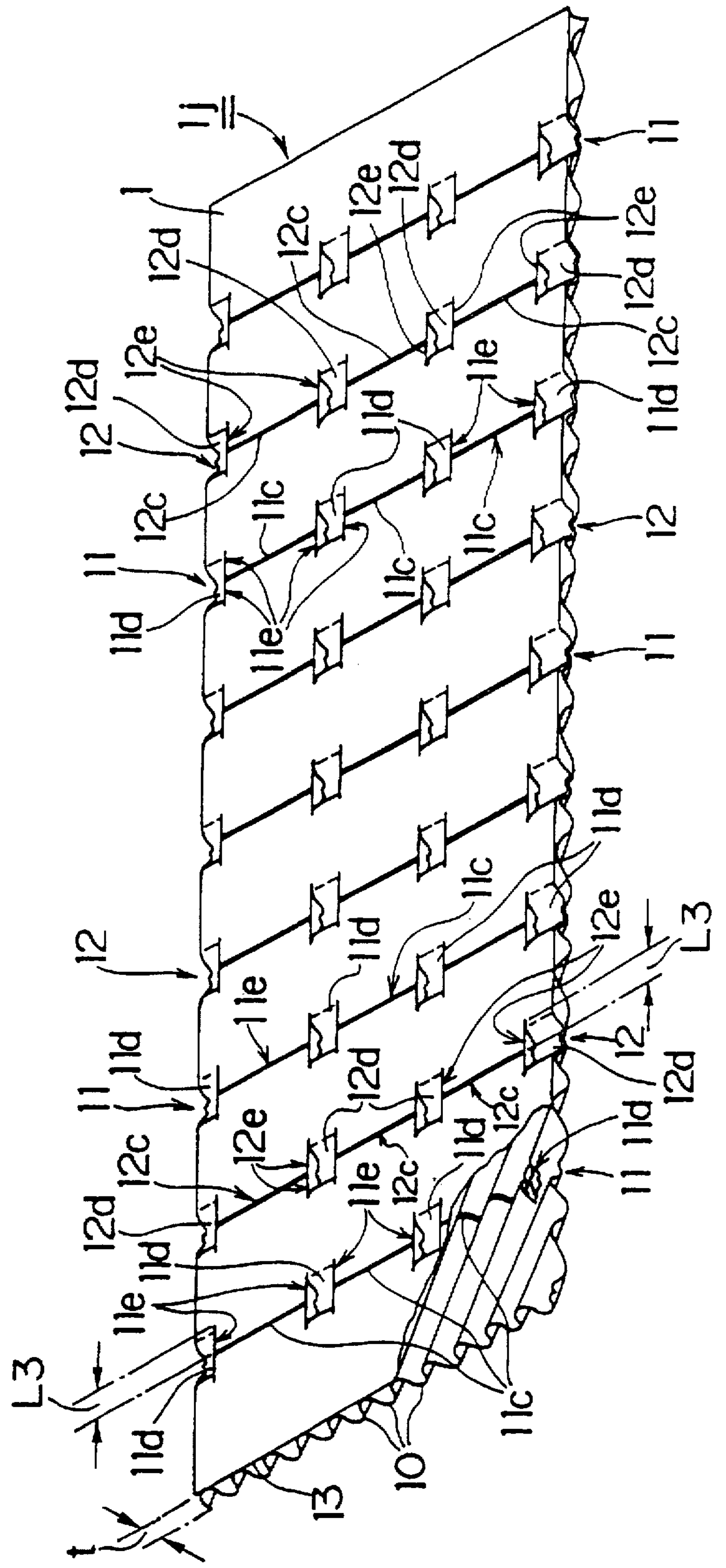
FIG. 11 is a fragmentary perspective view of a base board for a layered corrugated fiberboard structure in a yet further embodiment according to the present invention.
Figure 12:
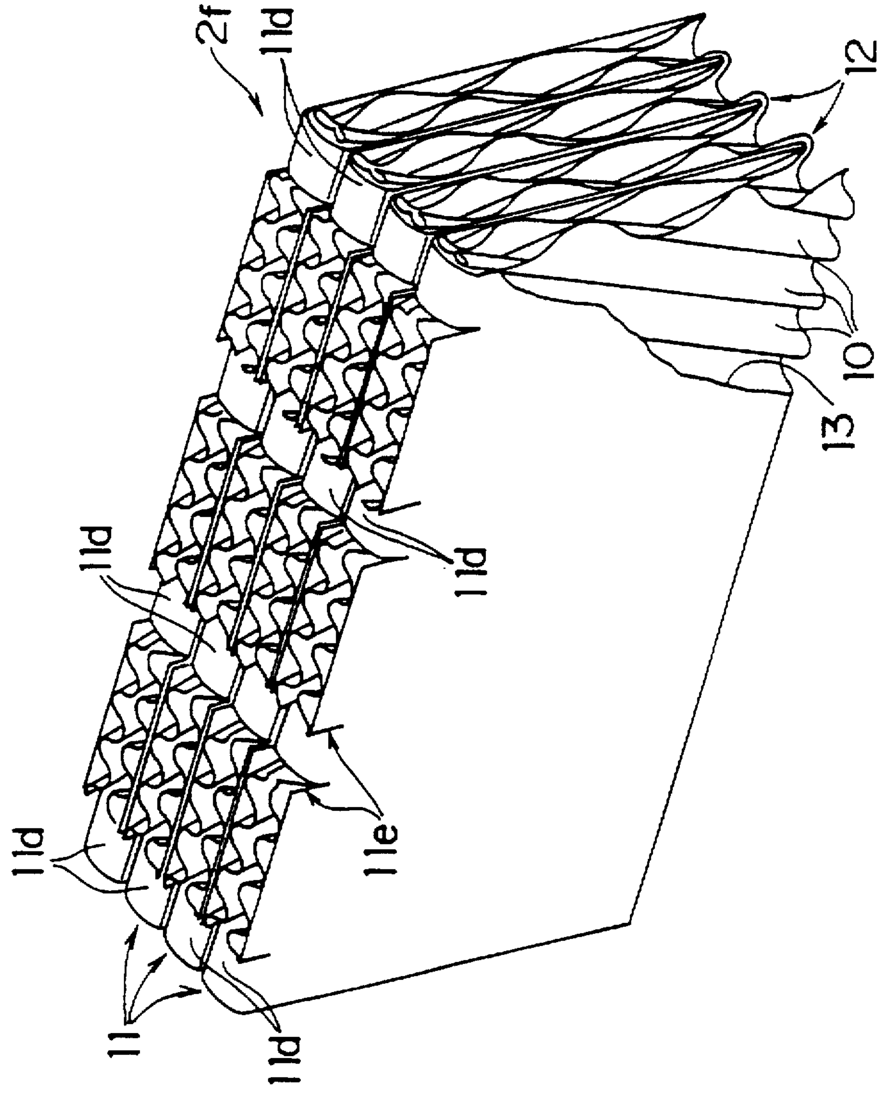
FIG. 12 is an enlarged, fragmentary, partially cutaway perspective view of a layered corrugated fiberboard structure formed by folding the base board for the layered corrugated fiberboard structure of FIG. 11.

FIGS. 11 and 12 show a base board for a layered corrugated fiberboard structure in a fifth embodiment according to the present invention.

A corrugated fiberboard material 1 for forming a base board 1*j* for a layered corrugated fiberboard structure in this embodiment is a single-faced corrugated fiberboard having a plurality of flutes oblique to the length.

A plurality of first folds 11 along which the corrugated fiberboard material 1 is folded in the shape of the inverted letter V and a plurality of second folds 12 along which the corrugated fiberboard material 1 is folded in a direction opposite to a direction in which the corrugated fiberboard material 1 is folded along the first folds 11 are formed in the corrugated fiberboard material 1 alternately at fixed intervals so as to extend in the cross direction of the corrugated fiberboard material 1.

The folds 11 and 12 are substantially the same in constitution.

Each of the folds 11(12) has short hinge portions 11*d* (12*d*), cut portions 11*c*(12*c*) longer than the hinge portions 11*d*(12*d*) and auxiliary cut portions 11*e*(12*e*) formed so as to be jointed to the cut portions 11*c*(12*c*) at the opposite ends of the cut portions 11*c*(12*c*). The hinge portions 11*d*(12*d*), the cut portions 11*c*(12*c*) and the auxiliary cut portions 11*e*(12*e*) are arranged alternately in a line.

The hinge portions 11*d* and 12*d* are formed by crushing portions of the corrugated fiberboard material 1 (particularly, portions of the flutes 10), and the cut portions 11*c*,12*c* and the auxiliary cut portions 11*e* and 12*e* penetrate the corrugated fiberboard material 1. The distance L3 between each end of the auxiliary cut portion 11*e*(12*e*) and the point of intersection of the cut portion 11*c*(12*c*) and the auxiliary cut portion 11*e*(12*e*) is slightly greater than the thickness t of the corrugated fiberboard material 1.

The directivity is given to the first folds 11 so that the corrugated fiberboard material 1 is folded along the first folds 11 in the shape of the inverted letter V as viewed in FIG. 11, and the directivity is given to the second folds so that the corrugated fiberboard material 1 is folded along the second folds 12 in the shape of the letter V as viewed in FIG. 11.

The cut portions 11*c*, 11*e*, 12*c* and 12*e* are formed simultaneously with cutting blades, not shown, which operate on one side of the corrugated fiberboard material 1, and the hinge portions 11*d* and 12*d* are formed simultaneously with a pressing block, not shown, which operates on one side of the corrugated fiberboard material 1.

The base board 1*j* for the layered corrugated fiberboard structure is folded in a zigzag shape by the folding mechanisms, not shown, and a layered corrugated fiberboard structure 2*f* as shown in FIG. 12 is formed.

When the base board 1*j* for the layered corrugated fiberboard structure is folded in a zigzag shape, portions of the base board 1*j* provided with the cut portions 11*c*, 12*c* and the auxiliary cut portions 11*e* and 12*e* of the corrugated fiberboard material 1 are raised, so that portions of the corrugated fiberboard material 1 corresponding to boundaries between the hinge portions 11*d* and 12*d* and the corresponding cut portions 11*c* and 12*c* may not be torn.

In the upper end surface, on which the folds 11 are gathered, of the layered corrugated fiberboard structure 2*f* shown in FIG. 12, the linerboard 13 forming the outer surface of the hinge portions 11*d* having a cross section substantially of a circular arc and cut end surfaces of the corrugated fiberboard material 1 formed by the cut portions 11*c* are arranged alternately. The outer surfaces of the hinge portions 11*d* are slightly below a plane including other portions.

In the lower end surface, on which the folds 12 are gathered, flutes formed by crushing the outer surfaces of the hinge portions 12*d* and cut end surfaces of the corrugated fiberboard material 1 formed by the cut portions 12*c* are arranged alternately, while opposite end surfaces of the corrugated fiberboard material 1 lie on the opposite sides of those portions. The outer surfaces of the hinge portions 12*d* are slightly below a plane including other portions.

Other functions and effects of the base board 1*j* for the layered corrugated fiberboard structure in this embodiment are substantially the same as those of the base board 1*g* for the layered corrugated fiberboard structure in the second embodiment and hence, the description thereof will be omitted.

Sixth Embodiment

Figure 13:
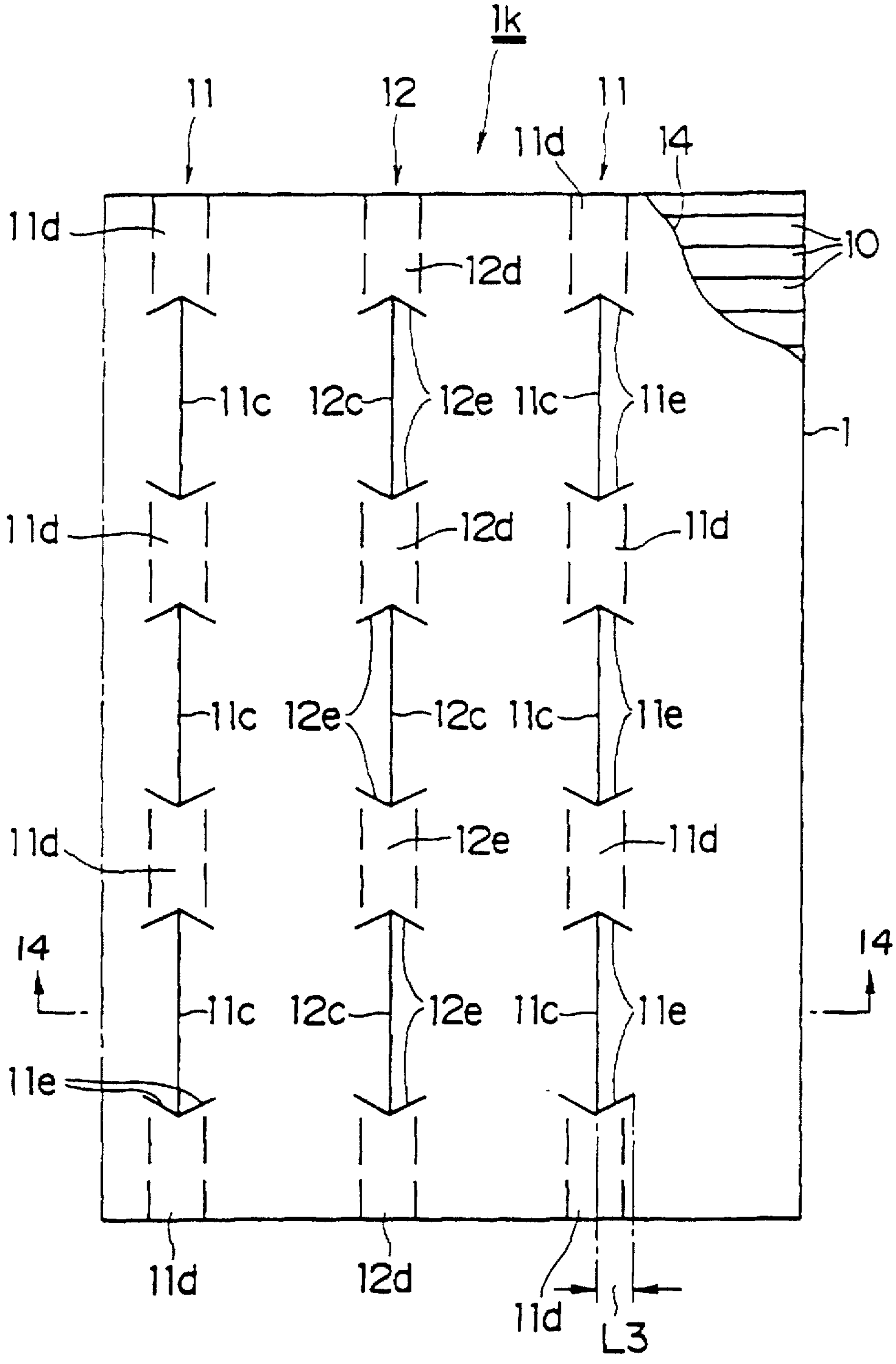
FIG. 13 is a fragmentary, partially cutaway plan view of a base board for a layered corrugated fiberboard structure in a yet further embodiment according to the present invention.
Figure 14:
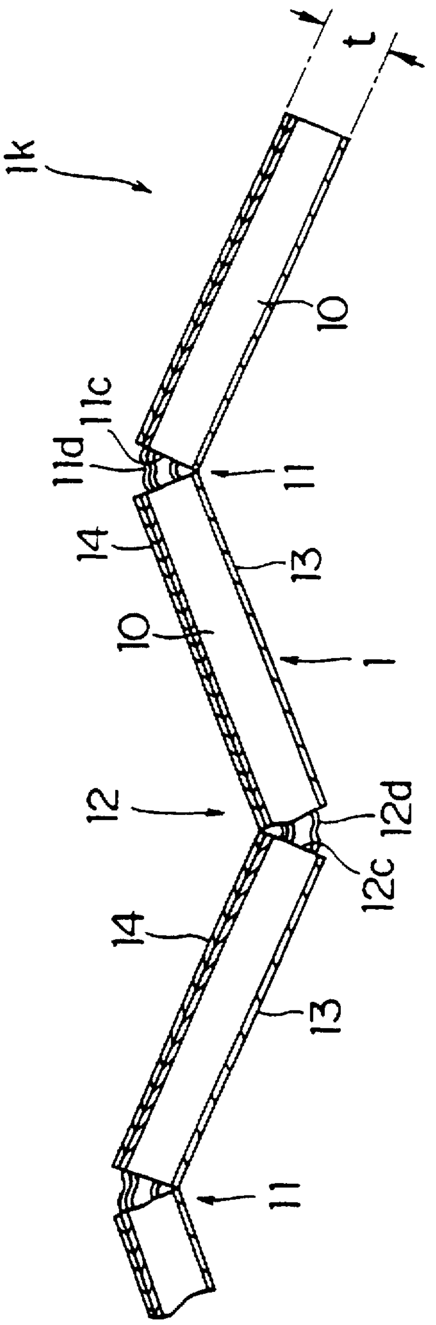
FIG. 14 is an enlarged, fragmentary sectional view taken along line A—A in FIG. 13.

FIGS. 13 and 14 show a base board for a layered corrugated fiberboard structure in a sixth embodiment according to the present invention.

A corrugated fiberboard material 1 for forming a base board 1*k* for a layered corrugated fiberboard structure in this embodiment is a double-faced corrugated fiberboard of a fixed width having a plurality of longitudinal flutes 10.

A plurality of first folds 11 along which the corrugated fiberboard material 1 is folded in the shape of the inverted letter V and a plurality of second folds 12 along which the corrugated fiberboard material 1 is folded in the shape of the letter V are formed in the corrugated fiberboard material 1 alternately at fixed intervals and in parallel in cross direction of the corrugated fiberboard material 1.

Although the corrugated fiberboard material 1 is folded in opposite directions along the first folds 11 and the second folds 12, respectively, the first folds 11 and the second folds 12 are the same in constitution.

Namely, each of the folds 11(12) has a plurality of hinge portions 11*d*(12*d*), cut portions (12*c*) and auxiliary cut portions 11*e*(12*d*). The hinge portions 11*d*(12*d*), the cut portions 11*c*(12*c*) and the auxiliary cut portions 11*e*(12*e*) are arranged alternately at fixed intervals and in parallel in the cross direction of the corrugated fiberboard material 1. The directivity for folding is given to the folds 11 and 12 so that the corrugated fiberboard material 1 is folded in the foregoing shapes along the folds 11 and 12.

In this embodiment, the auxiliary cut portions 11*e*(12*e*) joined to the opposite ends of each cut portions 11*c*(12*c*) are tapered so as to be at an acute angle to the cut portion 11*c*(12*c*).

The distance L3 between each end of the auxiliary cut portions 11*e*(12*e*) and the point of intersection of the cut portion 11*c*(12*c*) and the auxiliary cut portion 11*e*(12*e*) is slightly greater than the thickness t of the corrugated fiberboard material 1.

The base board in this embodiment is the same in other respects of the constitution as the base board 1*j* for the layered corrugated fiberboard structure in the fifth embodiment.

Figure 15:
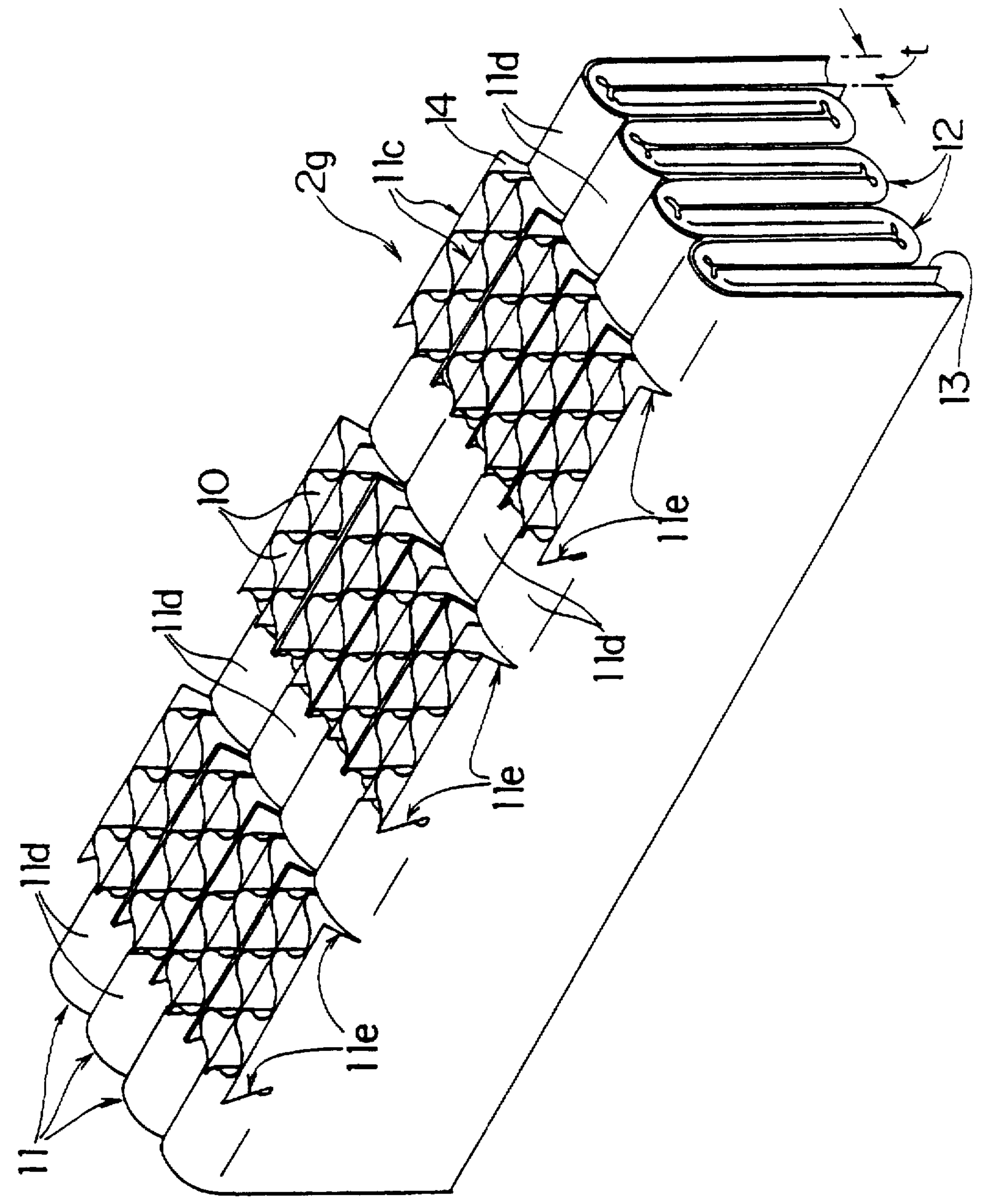
FIG. 15 is an enlarged perspective view of a layered corrugated fiberboard structure formed by folding the base board for the layered corrugated fiberboard structure of FIG. 14.

When an external force is applied to the base board 1*k* for the layered corrugated fiberboard structure so as to fold the base board 1*k* in a zigzag shape as shown in FIG. 14, a layered corrugated fiberboard structure 2*g* as shown in FIG. 15 is formed.

In the upper end surface, on which the folds 11 are gathered, of the layered corrugated fiberboard structure 2*g*, a linerboard 14 forming the outer surfaces of hinge portions 11*d* having a cross section substantially of a circular arc and cut end surfaces of the corrugated fiberboard material 1 formed by the cut portions 11*c* are arranged alternately. The outer surfaces of the hinge portions 11*d* are slightly below a plane including other portions.

In the lower end surface, on which the folds 12 are gathered, a linerboard 13 forming the outer surfaces of the hinge portions 12*d* and cut end surfaces of the corrugated fiberboard material 1 formed by the cut portions 12*c* are arranged alternately, and the opposite end surfaces of the corrugated fiberboard material 1 lie on the opposite sides of those portions.

The folds 11 and 12 of the base board 1*k* for the layered corrugated fiberboard structure in this embodiment are simultaneously formed by a press machine, not shown, using cutting blades and a pressing block which operate on one side of the corrugated fiberboard material 1.

The base board 1*k* for the layered corrugated fiberboard structure in this embodiment is used for substantially the same purposes as those for which the base board 1g for the layered corrugated fiberboard structure in the second embodiment is used.

Seventh Embodiment

Figure 16:
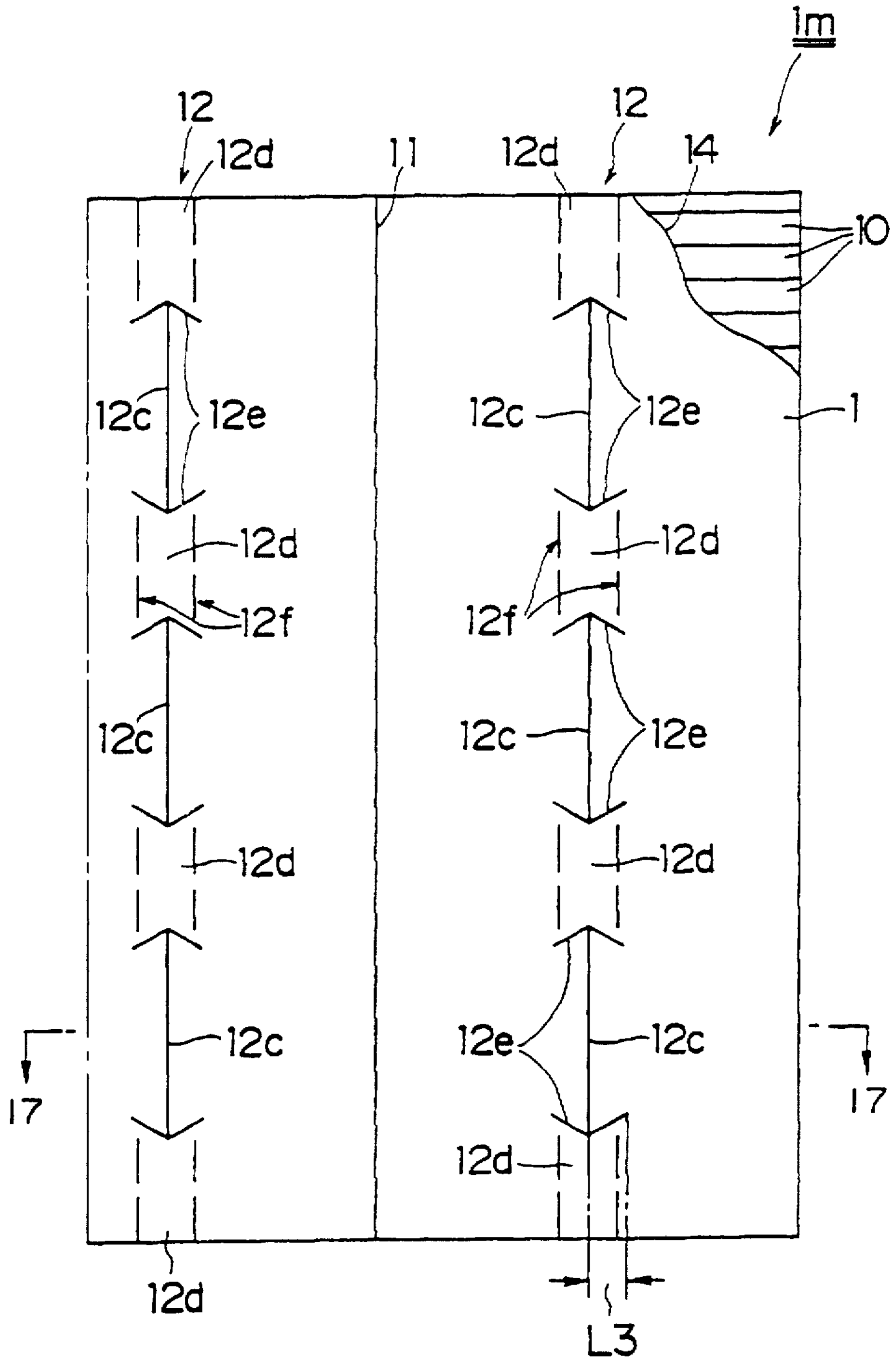
FIG. 16 is a fragmentary, partially cutaway plan view of a base board for a layered corrugated fiberboard structure in a yet further embodiment according to the present invention.
Figure 17:
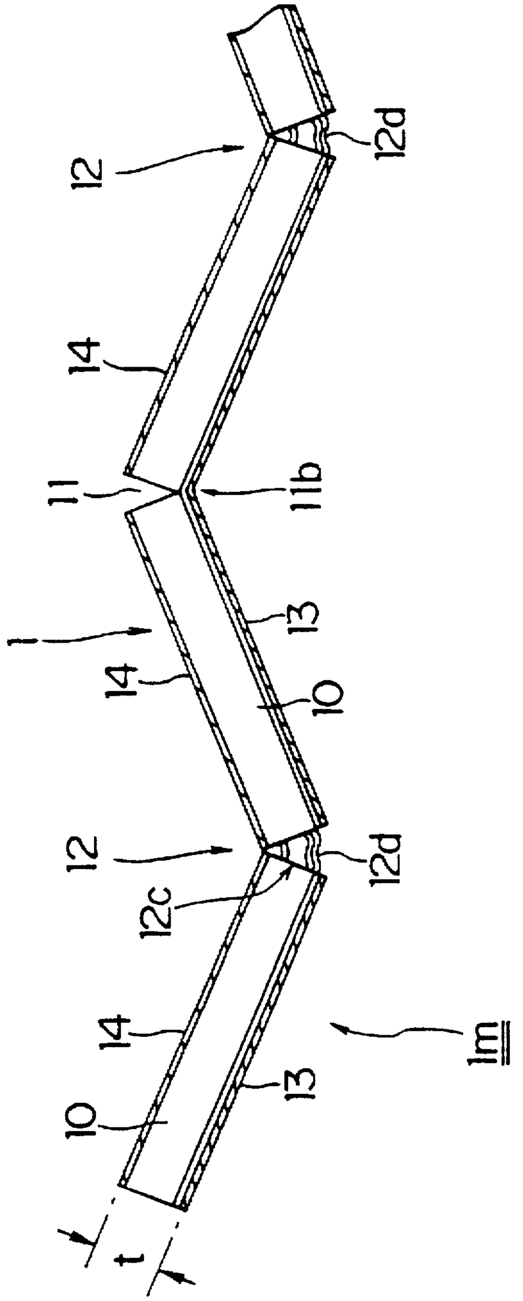
FIG. 17 is an enlarged, fragmentary sectional view taken along line B—B in FIG. 16.

FIGS. 16 and 17 show a base board for a layered corrugated fiberboard structure in a seventh embodiment.

A corrugated fiberboard material 1 for forming a base board 1m for a layered corrugated fiberboard structure in this embodiment is a double-faced corrugated fiberboard having a plurality of longitudinal flutes 10.

First folds 11 are formed by cutting portions of the corrugated fiberboard material 1 other than hinge portions 11b formed to be continuous to portions of a lower linerboard 13. Second folds 12 are formed by the same method as that of forming the second folds 12 of the base board 1k for the layered corrugated fiberboard structure in the sixth embodiment.

Figure 18:
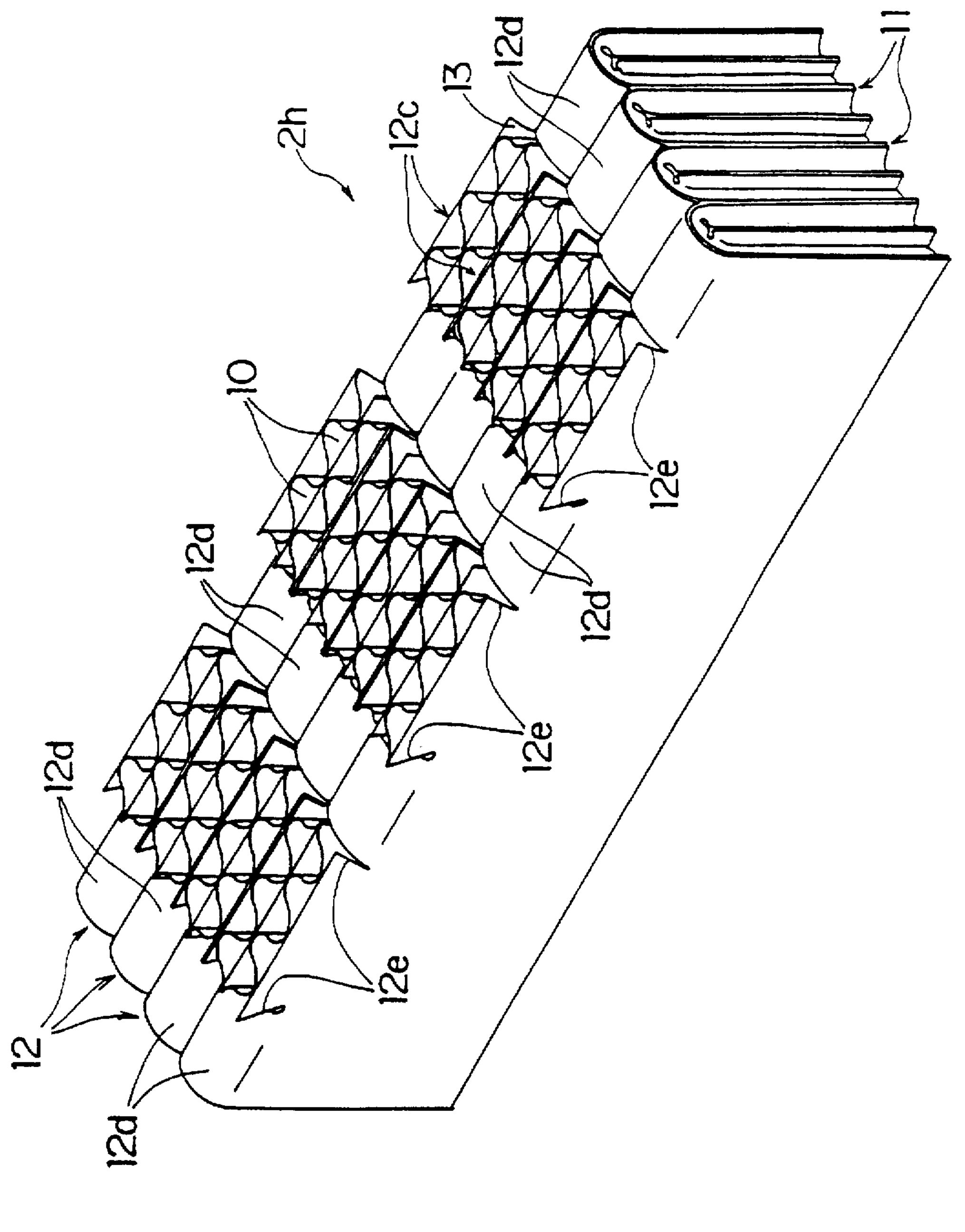
FIG. 18 is an enlarged perspective view of a layered corrugated fiberboard structure in an inverted position formed by folding the base board for the layered corrugated fiberboard structure of FIG. 16.

A layered corrugated fiberboard structure 2h as shown in FIG. 18 is formed by folding the base board 1m for the layered corrugated fiberboard structure in this embodiment in the zigzag shape.

An end surface of the layered corrugated fiberboard structure 2h, on which the first folds are gathered, has a honeycomb shape. On the other hand, an end surface, on which the second folds 12 are gathered, has an alternate arrangement of the liner board 13 forming the outer surfaces of the hinge portions 12d and cut end surfaces formed by cut portions 12c as shown in FIG. 18.

Other respects of the constitution, functions and effects of the base board 1m for the layered corrugated fiberboard structure in this embodiment are substantially the same as those of the sixth embodiment and hence, the description thereof will be omitted.

In the base board 1m for the layered corrugated fiberboard structure in the seventh embodiment, when forming, for example, the hinge portions 12d of the second folds 12, perforations are formed along lines 12f on the opposite sides of the hinge portions 12d of the corrugated fiberboard material 1, and the hinge portions 12d are formed in the shape of a quadrangular groove when portions of the corrugated fiberboard material 1 between the lines 12f are depressed.

When the layered corrugated fiberboard structure as shown in FIG. 18 is formed by folding the base board 1m for the layered corrugated fiberboard structure in a zigzag shape, the outer surfaces of the hinge portions 12d arranged on an end surface, on which the folds 12 are gathered, have a quadrangular cross section instead of a cross section of a circular arc.

Eighth and Ninth Embodiments

Figure 19:
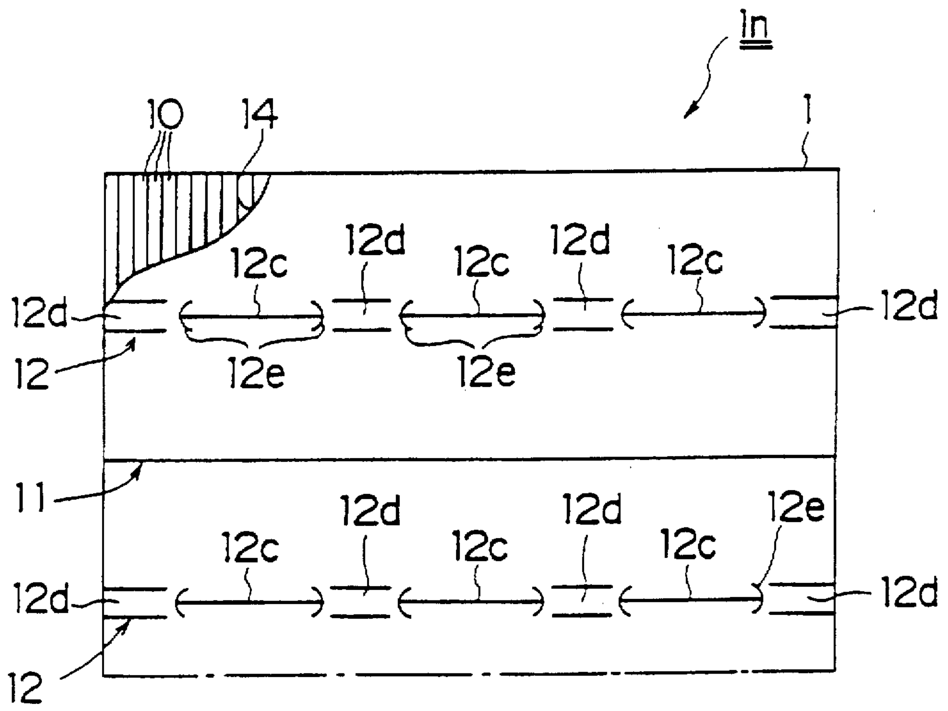
FIG. 19 is a fragmentary, partially cutaway plan view of a base board for a layered corrugated fiberboard structure in a yet further embodiment according to the present invention.

The auxiliary cut portions 12e joined to the opposite ends of the cut portions 12c of the second folds 12 may be formed, for example, in the planar shape of a circular arc as shown in FIG. 19.

Figure 20:
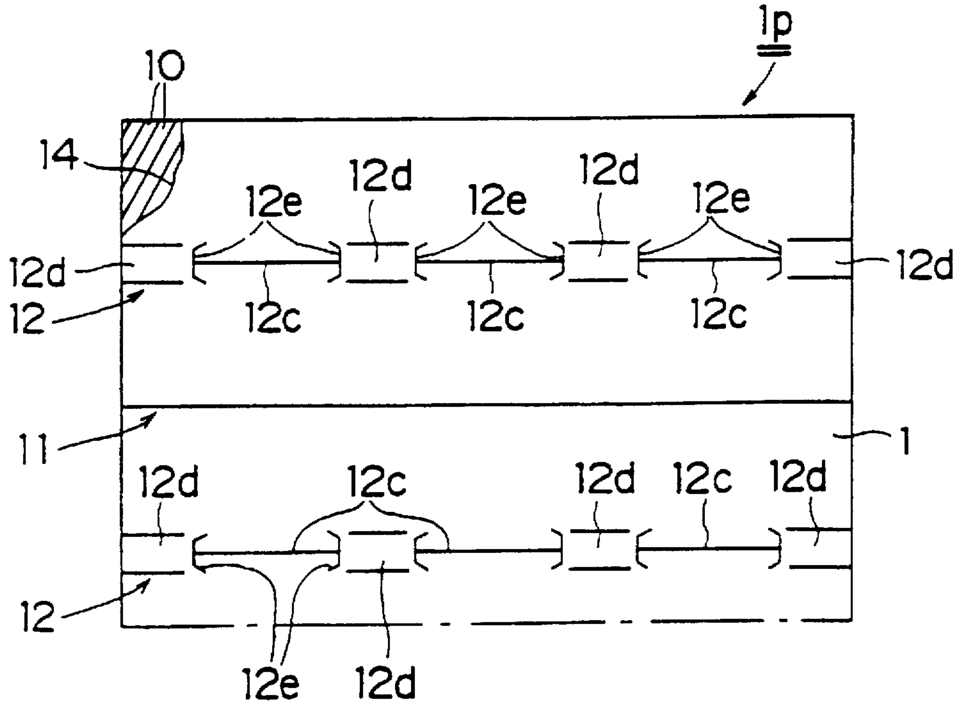
FIG. 20 is a fragmentary, partially cutaway plan view of a base board for a layered corrugated fiberboard structure in a yet further embodiment according to the present invention.

Otherwise, the auxiliary cut portions 12e may be formed in a planar shape as shown in FIG. 20.

A corrugated fiberboard material 1 shown in FIG. 19 is a double-faced corrugated fiberboard having a plurality of longitudinal flutes 10, and a corrugated fiberboard material 1 shown in FIG. 20 is a double-faced corrugated fiberboard having a plurality of flutes 10 inclined at a predetermined angle to the length thereof.

Other respects of the constitution, functions and effects of base boards in and 1p for the layered corrugated fiberboard structure shown in FIGS. 19 and 20 are substantially the same as those of the base board 1mfor the layered corrugated fiberboard structure in the seventh embodiment and hence, the description thereof will be omitted.

Tenth Embodiment

Figure 21:
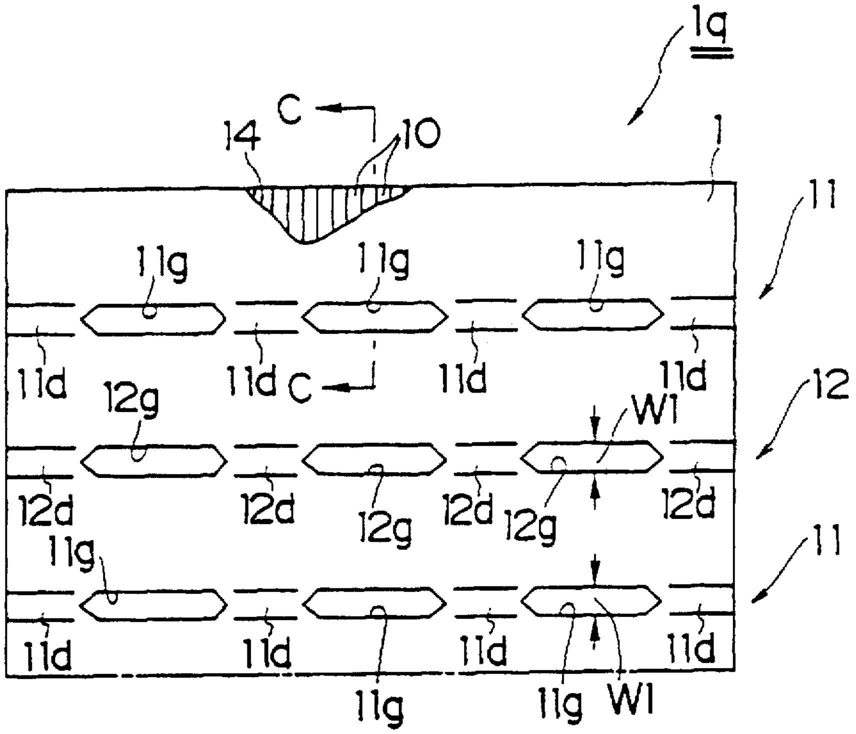
FIG. 21 is a fragmentary, partially cutaway plan view of a base board for a layered corrugated fiberboard structure in a yet further embodiment according to the present invention.
Figure 22:
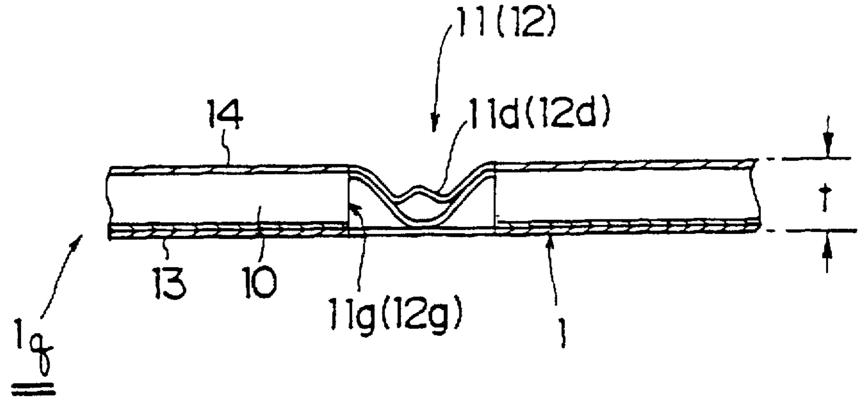
FIG. 22 is an enlarged, fragmentary sectional view taken along line C—C in FIG. 21.

FIGS. 21 and 22 show a base board 1q for a layered corrugated fiberboard structure in a tenth embodiment according to the present invention.

A corrugated fiberboard material 1 is a double-faced corrugated fiberboard having a plurality of longitudinal flutes 10. First folds 11 and second folds 12 are formed in the corrugated fiberboard material 1 alternately in parallel to each other and substantially perpendicularly to the flutes 10.

Each of the folds 11(12) has short hinge portions 11d(12d) formed by crushing portions of the corrugated fiberboard material 1 (particularly the flutes 10), and slits 11g(12g) shorter than the hinge portions 11d(12d). The hinge portions 11d(12d) and the slits 11g(12g) are arranged alternately in a line.

The directivity for folding is given to the first folds 11 so that the corrugated fiberboard material 1 is folded in the shape of the inverted letter V along the first folds 11, and the directivity for folding is given to the second folds 12 so that the corrugated fiberboard material 1 is folded in the shape of the letter V along the second folds 12.

The opposite ends of the slits 11g and 12g are tapered toward the adjacent hinge portions 11d and 12d, respectively. The width w1 of the slits 11g and 12g is about twice the thickness t of the corrugated fiberboard material 1.

Figure 23:
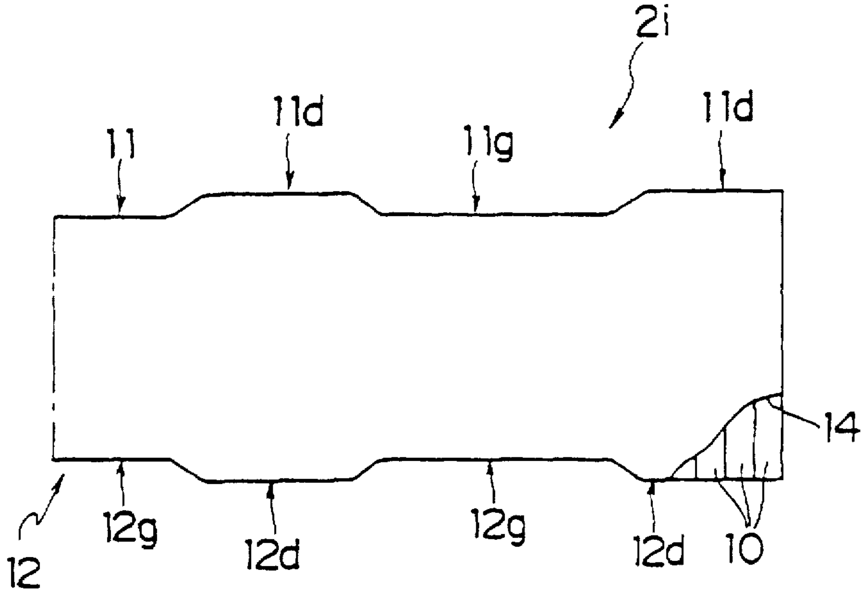
FIG. 23 is a fragmentary, partially cutaway front view of a layered corrugated fiberboard structure formed by folding the base board of FIG. 21.

When the base board 1q for the layered corrugated fiberboard structure is folded along the folds 11 and 12 in a zigzag shape, a layered corrugated fiberboard structure 2i having stacked layers demarcated by the folds 11 and 12 as shown in FIG. 23 is formed.

When the base board 1q for the layered corrugated fiberboard structure in this embodiment is folded in the aforesaid manner, the hinge portions 11d and 12d are bent in opposite directions, respectively, and, at the same time, the inner surfaces of the opposite sides of the slits 11g and 12g are exposed. Accordingly, the hinge portions 11d and 12d and the inner surfaces of the slits 11g and 12g are arranged alternately on the upper and lower surfaces of the layered corrugated fiberboard structure 2i formed by folding the base board 1q for the layered corrugated fiberboard structure, respectively.

As shown in FIG. 23, the inner surfaces of the slits 11g and 12g on the upper and lower surfaces of the layered corrugated fiberboard structure 2i are below planes including the hinge portions 11d and 12d, respectively.

Other respects of the constitution, functions and effects of the base board 1q for the layered corrugated fiberboard structure in this embodiment are substantially the same as those of the sixth embodiment and hence, the description thereof will be omitted.

Eleventh Embodiment

Figure 24:
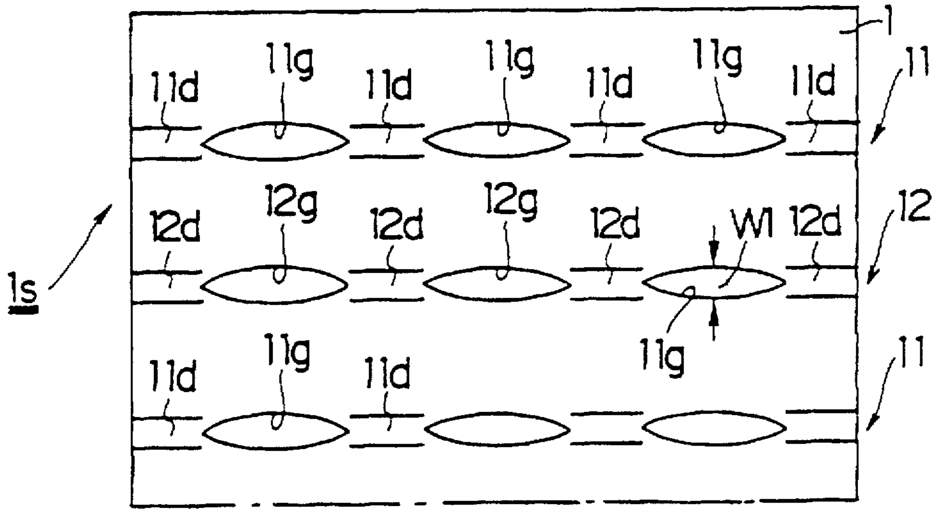
FIG. 24 is a fragmentary plan view of a base board for a layered corrugated fiberboard structure in a yet further embodiment according to the present invention.

FIG. 24 shows a base board 1s for a layered corrugated fiberboard structure. The base board 1s has folds 11 and 12 provided with slits 11g and 12g corresponding to those shown in FIG. 21 and having a planar shape resembling the cross section of a convex lens.

Other respects of the constitution, functions and effects of the base board 1s for the layered corrugated fiberboard structure are substantially the same as those of the base board 1q for the layered corrugated fiberboard structure in the tenth embodiment and hence, the description thereof will be omitted.

The first folds 11 of the base boards 1s and 1q in the tenth and eleventh embodiments may be the same as those of the base board 1m for the layered corrugated fiberboard structure shown in FIG. 16.

Twelfth Embodiment

Figure 25:
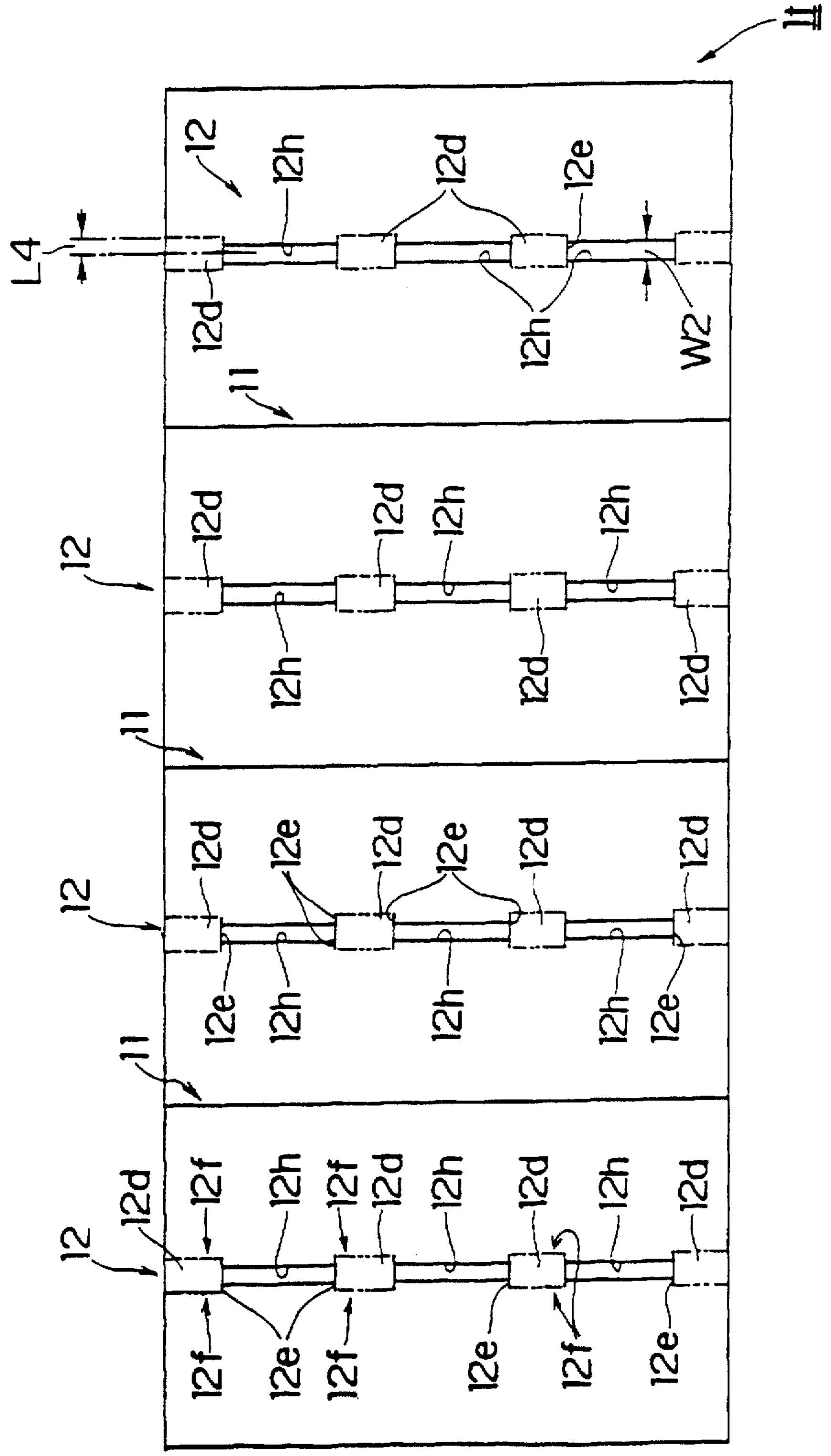
FIG. 25 is a plan view of a base board for a layered corrugated fiberboard structure in a yet further embodiment according to the present invention.

FIG. 25 shows a base board 1t for a layered corrugated fiberboard structure in a twelfth embodiment according to the present invention.

A corrugated fiberboard material 1 for forming the base board 1t for the layered corrugated fiberboard structure is a double-faced corrugated fiberboard having flutes 10 (FIG. 26) inclined to the length thereof.

A plurality of first folds 11 and a plurality of second folds 12 are formed in the corrugated fiberboard material 1 alternately at fixed intervals and in parallel to each other in the cross direction.

The first folds 11 along which the corrugated fiberboard material 1 is folded in the shape of the inverted letter V are substantially similar to the first folds 11 of the embodiment shown in FIG. 16.

Each of the second folds along which the corrugated fiberboard material 1 is folded in the shape of the letter V has hinge portions 12d, which have a predetermined length and are formed by crushing portions of the flutes 10 of the corrugated fiberboard material 1, and slits 12h which are longer than the hinge portions 12d and have a width w2 slightly smaller than the thickness t of the corrugated fiberboard material 1. The second folds 12 are arranged alternately in the cross direction of the corrugated fiberboard 1.

Auxiliary cut portions 12e penetrating the corrugated fiberboard material 1 are formed at the opposite ends of each slit 12h so as to extend across the opposite ends of the slit 12h. The distance L4 between each end of the auxiliary cut portion 12e and the center line of the slit 12h with respect to the cross direction of the slit 12h is approximately equal to the thickness t of the corrugated fiberboard material 1.

The directivity for folding is given to the folds 11 and 12 so that the corrugated fiberboard material 1 is folded along the folds 11 and 12 in the aforesaid manner.

Figure 26:
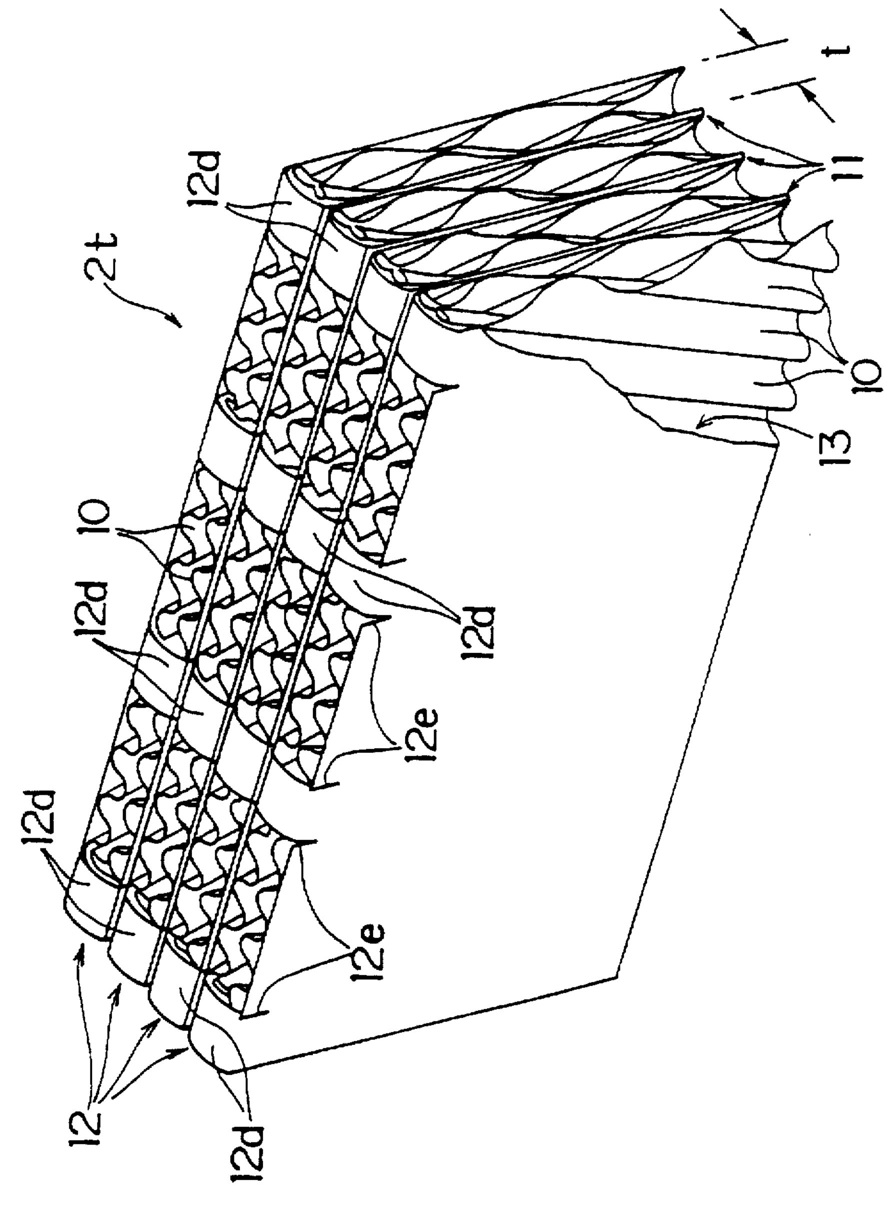
FIG. 26 is an enlarged, fragmentary, partially cutaway perspective view of a layered corrugated fiberboard structure formed by folding the base board for the layered corrugated fiberboard structure of FIG. 25.

When the base board 1t for the layered corrugated fiberboard structure in this embodiment is folded along the folds 11 and 12 in a zigzag shape, the hinge portions 12d are bent in the folding direction, the inner surfaces of the sides of the slits 12h are turned through an angle of 90° so as to be exposed, and a layered corrugated fiberboard structure 2t as shown in FIG. 26 is formed.

As shown in FIG. 26, the outer surfaces of the hinge portions 12d and the inner end surfaces of the sides of the slits 12h (pseudo honeycomb surfaces) are arranged alternately in an end surface of the layered corrugated fiberboard structure 2t, on which the folds 12 are gathered. In this end surface, the inner surfaces of the sides of the slits 12h and the hinge portions 12d are on substantially the same level.

On the other hand, the surface having a pseudo honeycomb structure by the flutes 10 of the corrugated fiberboard material 1 is exposed to the end surface on which the folds 11 are gathered.

According to the base board 1t for the layered corrugated fiberboard structure of this embodiment, when the base board 1t is folded in a zigzag shape to form the layered corrugated fiberboard structure 2t, the end surfaces, on which the second folds 12 are gathered, are on substantially the same level as a whole, as described above.

Since the auxiliary cut portions 12e penetrating the corrugated fiberboard material 1 are formed at the opposite ends of each slit 12h so as to extend across the opposite ends of the slit 12h, portions of the corrugated fiberboard material 1 around the opposite sides of the slit 12h are raised smoothly when the corrugated fiberboard material 1 is folded, and hence, portions of a linerboard 13 between the slits 12h and the hinge portions 12d may be prevented from being torn.

Figure 27:
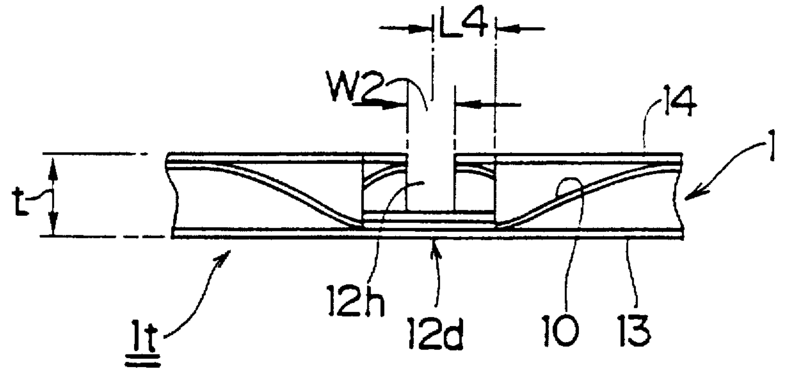
FIG. 27 is an enlarged fragmentary sectional view of a modification of the base board for the layered corrugated fiberboard structure of FIG. 25.

Preferably, the hinge portions 12d of the base board 1t for the layered corrugated fiberboard structure in this embodiment are formed in the shape of a groove having a quadrangular cross section as shown in FIG. 27. The hinge portions 12d may be formed in such a shape by forming perforations along lines 12f on the opposite sides of the hinge portions 12d (FIG. 25) and depressing portions between the lines 12f.

When the hinge portions 12d formed in the shape of the groove having a quadrangular cross section are bent in the folding direction, portions of the hinge portions 12d corresponding to the side walls of the groove turn through an angle of about 90° into (i.e., fall into) the groove-shaped hinge portions 12d. Accordingly, the base board 1t for the layered corrugated fiberboard structure is more smoothly folded, the outer surfaces of the hinge portions 12d exposed on an end surface of the layered corrugated fiberboard structure 2t have a substantially quadrangular shape and irregularities are hardly formed in the end surface.

Thirteenth Embodiment

Figure 28:
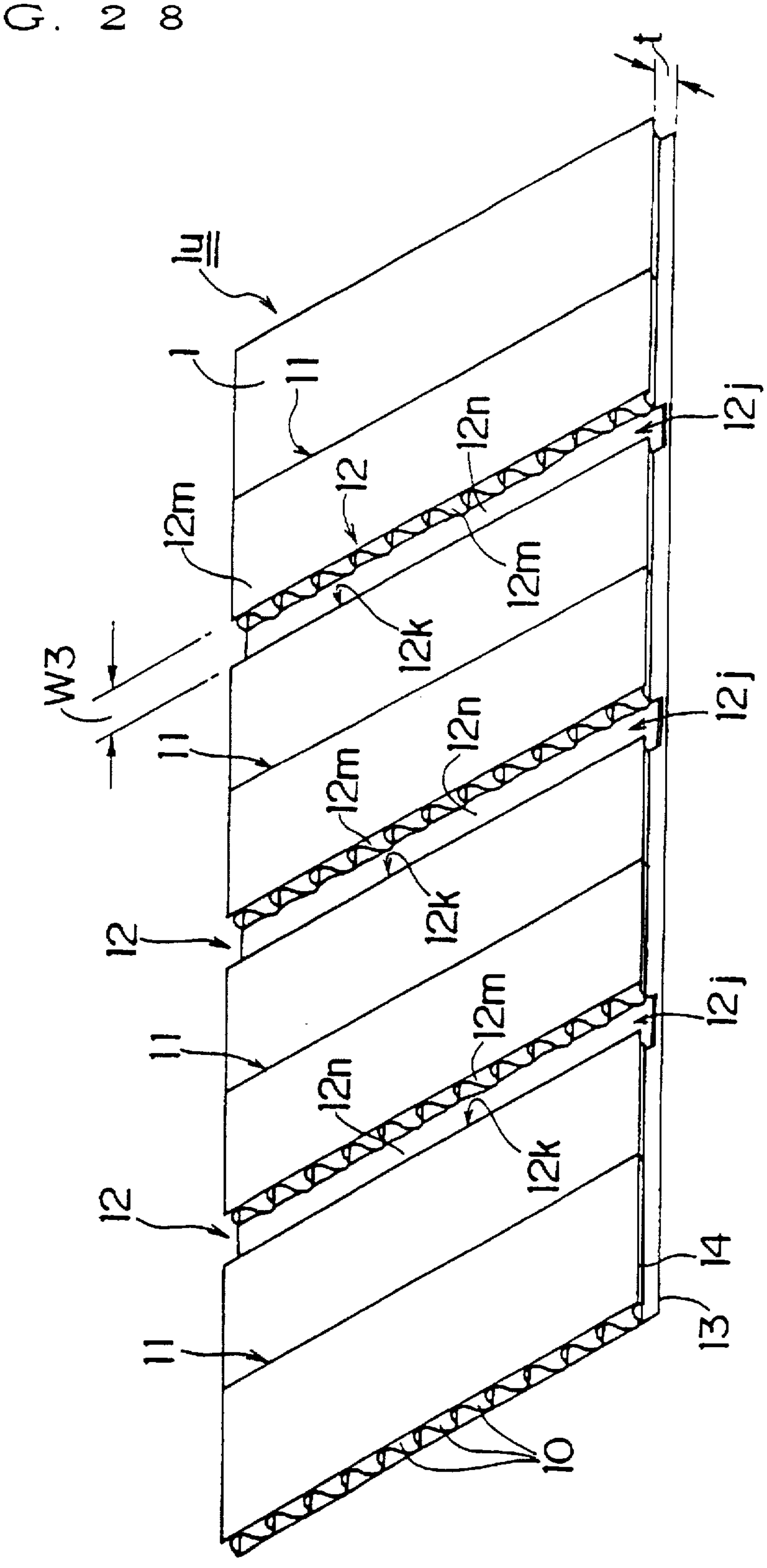
FIG. 28 is a perspective view of a base board for a layered corrugated fiberboard structure in a yet further embodiment according to the present invention.

FIG. 28 shows a base board for a layered corrugated fiberboard structure in a thirteenth embodiment according to the present invention.

A corrugated fiberboard material 1 for forming a base board 1u for a layered corrugated fiberboard structure in this embodiment is a double-faced corrugated fiberboard having a plurality of longitudinal flutes 10.

A plurality of first folds 11 and a plurality of second folds 12 are formed in the corrugated fiberboard material 1 alternately at fixed intervals and in parallel to each other in the cross direction.

The corrugated fiberboard material 1 is folded along the first folds 11 in the shape of the inverted letter V, while the corrugated fiberboard material 1 is folded along the second folds 12 in the shape of the letter V as viewed in FIG. 28.

The first folds are formed similarly to those of the base board for the layered corrugated fiberboard structure in the seventh embodiment.

The second folds 12 are grooves 12j of a substantially quadrangular cross section having a width w3 about twice the thickness t of the corrugated fiberboard material 1. The grooves 12j are formed on the side of the corrugated fiberboard material 1 that forms the inner surface when the corrugated fiberboard material 1 is folded along the second folds 12.

Each of the grooves 12j forming the second folds 12 is defined by opposite side surfaces 12k and 12m formed by cutting the corrugated fiberboard material 1 in the direction of the thickness, and a bottom surface 12n formed by crushing a flute portion of the corrugated fiberboard material 1 between the opposite side surfaces 12k and 12m.

The grooves 12j are easily formed by cutting portions of an upper linerboard 14 and the flutes 10 corresponding to the opposite side surfaces 12k and 12m of the corrugated fiberboard material 1 so as to leave a lower linerboard 13, and crushing the flute portion of the corrugated fiberboard material 1 between the cut portions corresponding to the opposite side surfaces 12k and 12m by means of depressing against the flute portion.

The folds 11 and 12 are simultaneously formed by a press machine, not shown, having cutting blades and a pressing block which operate on the upper side of the corrugated fiberboard material 1 as viewed in FIG. 28.

Figure 29:
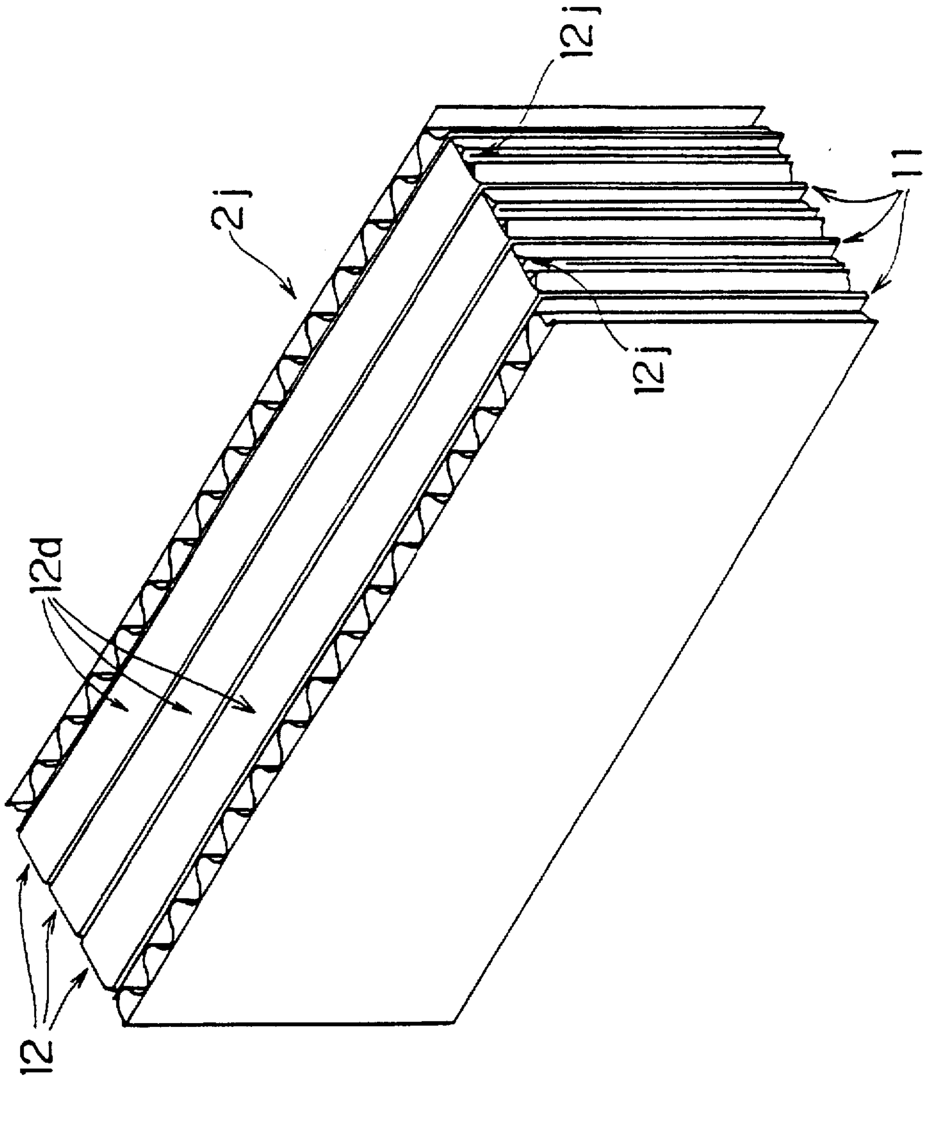
FIG. 29 is an enlarged perspective view of a layered corrugated fiberboard structure in an inverted position formed by folding the base board for the layered corrugated fiberboard structure of FIG. 28.

The base board 1u for the layered corrugated fiberboard structure in this embodiment is folded along the folds 11 and 12 in a zigzag shape by compressing the base board 1u transversely as viewed in FIG. 28 by a folding machine, not shown, to form a layered corrugated fiberboard structure 2j as shown in FIG. 29.

When folding the base board 1*u* in such a shape, the opposite side surfaces 12*k* and 12*m* of the grooves 12*j* fall into the grooves 12*j*, so that the base board 1*u* is very smoothly folded. Since the outer surfaces of the hinge portions 12*d* exposed on an end surface of the layered corrugated fiberboard structure 2*j* thus folded has a substantially quadrangular cross section, irregularities are hardly formed in the end surface.

Other respects of the constitution, functions and effects of the base board 1*u* for the layered corrugated fiberboard structure in this embodiment are substantially the same as those of the base board 1*m* for the layered corrugated fiberboard structure in the seventh embodiment and hence, the description thereof will be omitted.

The second folds 12 of the embodiments shown in FIGS. 21, 24, 25 and 28 are formed even if the corrugated fiberboard material 1 is a corrugating medium having flutes or a single-faced corrugated fiberboard.

Fourteenth Embodiment

Figure 30:
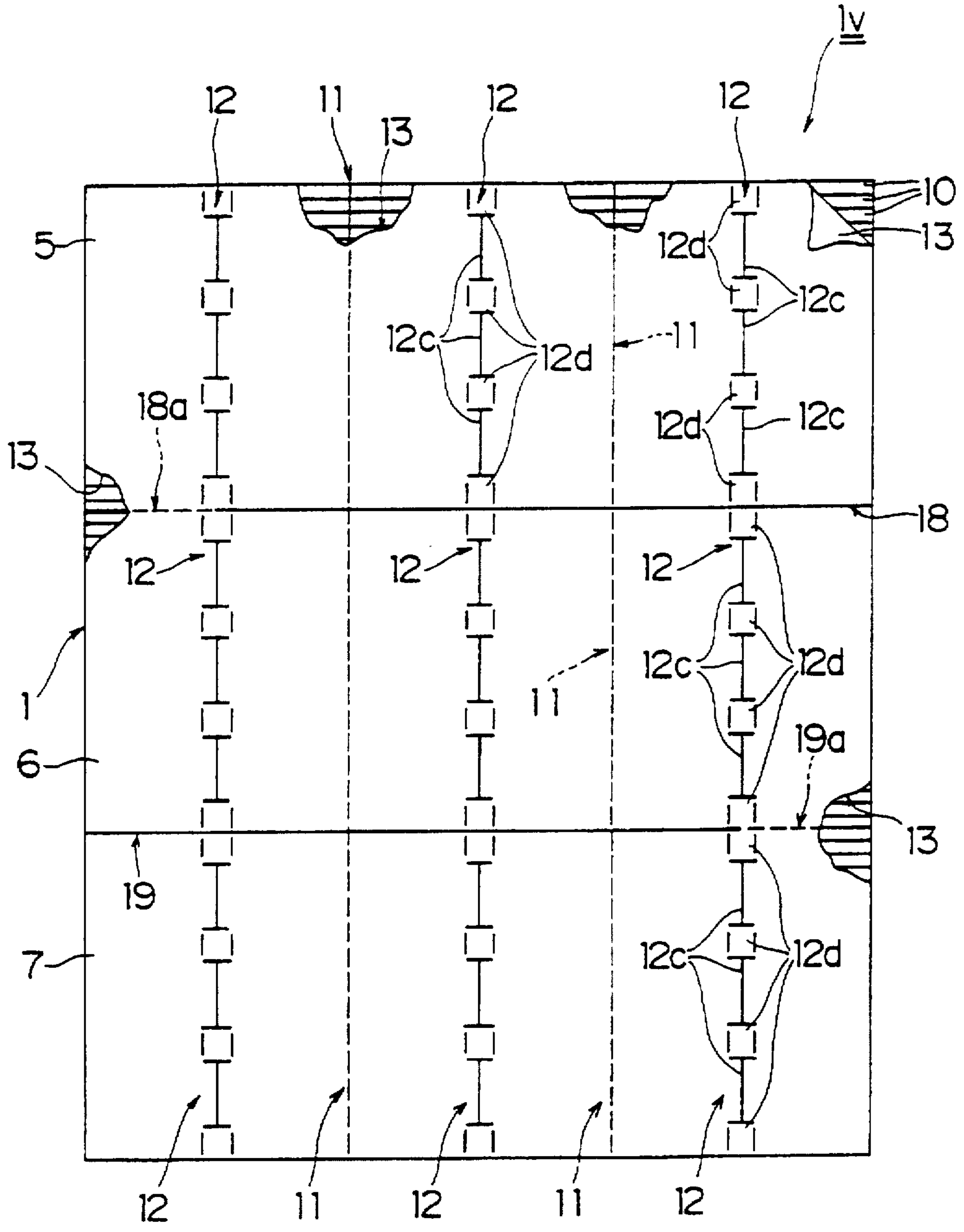
FIG. 30 is a partially cutaway back view of a base board for a layered corrugated fiberboard structure in a yet further embodiment according to the present invention.

FIG. 30 show a base board for a layered corrugated fiberboard structure in a fourteenth embodiment according to the present invention.

A quadrangular corrugated fiberboard material 1 for forming a base board 1*v* for a layered corrugated fiberboard structure in this embodiment is a double-faced corrugated fiberboard having a plurality of flutes 10 extending in the transverse direction, as viewed in FIG. 30.

A plurality of first folds 11 and a plurality of second folds, as viewed in FIG. 30, are formed in the corrugated fiberboard material 1 alternately at fixed intervals in the vertical direction.

The folds 11 and 12 are substantially the same as the folds 11 and 12 of the base board 1*m* for the layered corrugated fiberboard structure in the embodiment shown in FIG. 16, respectively.

In the state shown in FIG. 30, in which the back surface of the base board 1*v* is shown, the first folds 11 are formed so that the corrugated fiberboard material 1 is folded in the shape of the letter V along the first folds 11, and the second folds 12 are formed so that the corrugated fiberboard material 1 is folded in the shape of the inverted letter V along the second folds 12.

The corrugated fiberboard material 1 is vertically segmented into segments 5, 6 and 7 by a cut portion 18 continuous with a fold 18*a* formed near the left end, as viewed in FIG. 30, and a cut portion 19 continuous with a fold 19*a* formed near the right end.

The cut portions 18 and 19 penetrate the corrugated fiberboard material 1, and the folds 18*a* and 19*a* are formed by cutting portions of the corrugated fiberboard material 1 other than portions of hinge portions formed to be continuous with portions of a linerboard 13. The corrugated fiberboard material 1 is folded in the shape of the letter V along the folds 18*a* and 19*a*, as viewed in FIG. 30.

Figure 31A:
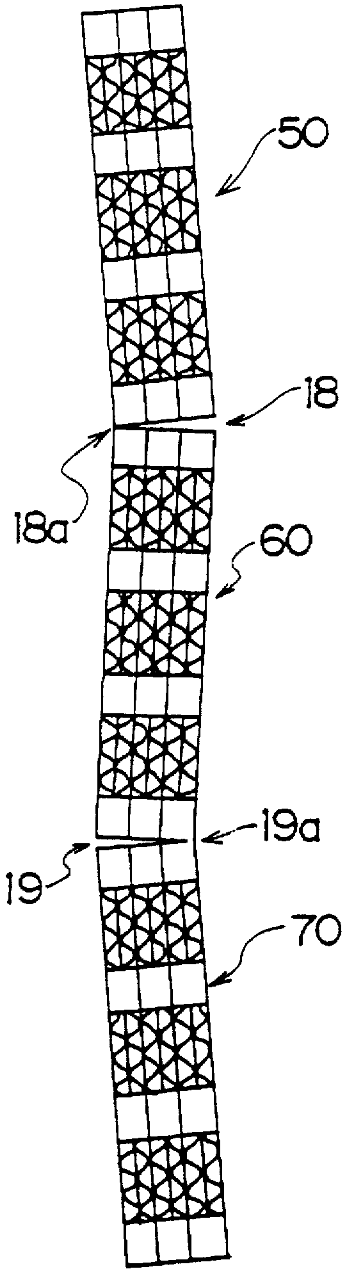
FIGS. 31(*a*) and 31(*b*) are plan views of a layered corrugated fiberboard structure formed by folding the base board for the layered corrugated fiberboard structure of FIG. 30 before and after completion, respectively.
Figure 31B:
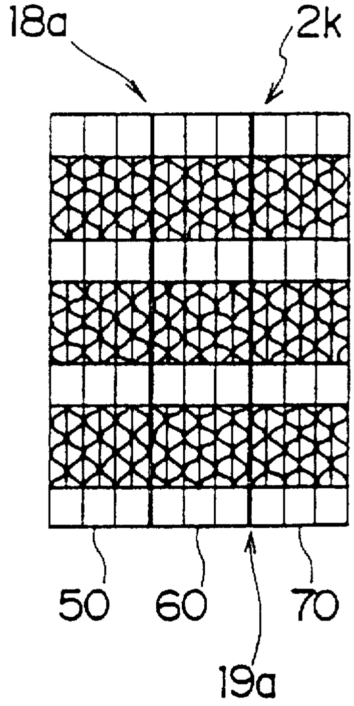

The base board 1*v* for the layered corrugated fiberboard structure in this embodiment is folded in a zigzag shape as shown in FIG. 31(*a*) along the folds 11 and 12 extending throughout the segments 5, 6 and 7. Consequently, a segmental layered corrugated fiberboard structure having unit layered corrugated fiberboard structures 50, 60 and 70 segmented by the folds 18*a* and 19*a* as shown in FIG. 31(*a*) is formed.

Then, the unit layered corrugated fiberboard structures 50, 60 and 70 are folded along the folds 18*a* and 19*a* to obtain a multilayer corrugated fiberboard structure 2*k* as shown in FIG. 31(*b*).

The base board 1*v* for the layered corrugated fiberboard structure in this embodiment is effective in fabricating a multilayer corrugated fiberboard structure by processing the corrugated fiberboard material 1 having a high area efficiency, instead of processing a very long corrugated fiberboard material 1 obtained by cutting a web of corrugated fiberboard material.

Other respects of the constitution, functions and effects of the base board for the layered corrugated fiberboard structure 1*v* are substantially the same as those of the base board for the layered corrugated fiberboard structure shown in FIG. 16 and hence, the description thereof will be omitted.

Fifteenth Embodiment

Figure 32:
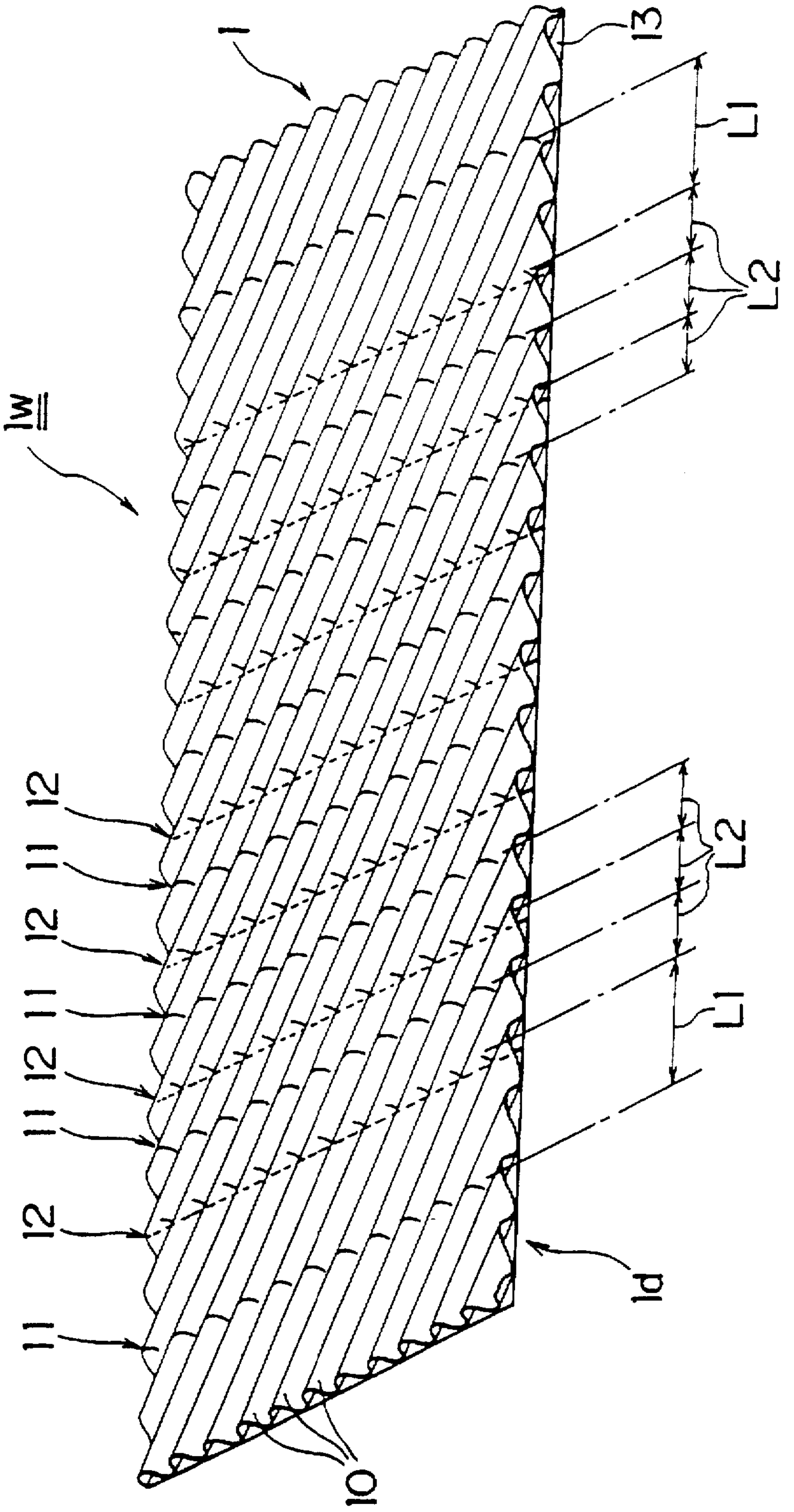
FIG. 32 is a perspective view of a base board for a layered corrugated fiberboard structure in a yet further embodiment according to the present invention.

FIG. 32 shows a base board for a layered corrugated fiberboard structure in a fifteenth embodiment according to the present invention.

A corrugated fiberboard material 1 for forming a base board 1*w* for a layered corrugated fiberboard structure in this embodiment is a single-faced corrugated fiberboard having a plurality of flutes 10 inclined at a predetermined angle to the length thereof.

As shown in FIG. 32, a plurality of first folds 11 along which the corrugated fiberboard material 1 is folded in the shape of the inverted letter V and a plurality of second folds 12 along which the corrugated fiberboard material 1 is folded in the shape of the letter V are formed in the corrugated fiberboard material 1 alternately in the cross direction of the corrugated fiberboard material 1 and in parallel to each other.

The first folds 11 and the second folds 12 are substantially the same as the folds 11 and 12 of the base board for the layered corrugated fiberboard structure in the first embodiment shown in FIG. 2. Equal intervals L2 between the folds 11 and 12 in the middle section of the corrugated fiberboard material 1 are smaller than equal intervals L1 between the folds 11 and 12 in the opposite end sections of the corrugated fiberboard material 1.

Figure 34:
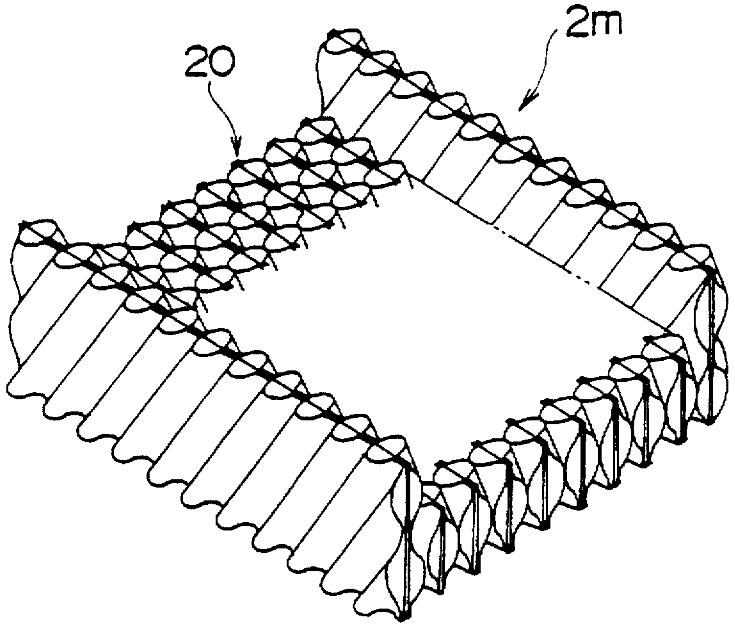
FIG. 34 is a perspective view of a layered corrugated base board structure formed by folding the fiberboard for the layered corrugated fiberboard structure of FIG. 32.

Since the intervals L2 between the folds 11 and 12 in the middle section of the corrugated fiberboard material 1 are smaller than the intervals L1 between the folds 11 and 12 in the opposite end sections in the base board 1*w* for the layered corrugated fiberboard structure in this embodiment, a layered corrugated fiberboard structure 2*m* formed by folding the base board 1*w* in a zigzag shape has a groove 20 in its upper surface as shown in FIG. 34.

Therefore, when the intervals L1 are smaller than the intervals L2, the layered corrugated fiberboard structure 2*m* has a protrusion, instead of the groove 20 shown in FIG. 34.

Thus, a desired groove or protrusion is formed in the upper and/or the lower surface of the layered corrugated fiberboard structure 2*m* by selectively determining the intervals between the folds 11 and 12 in sections of the base board 1*w*.

The intervals between the folds 11 and 12 may be varied also in other embodiments, and layered corrugated fiberboard structures of various structures are formed by the based boards in the other embodiments according to a variation pattern of the intervals L1 and L2.

Sixteenth Embodiment

Figure 33:
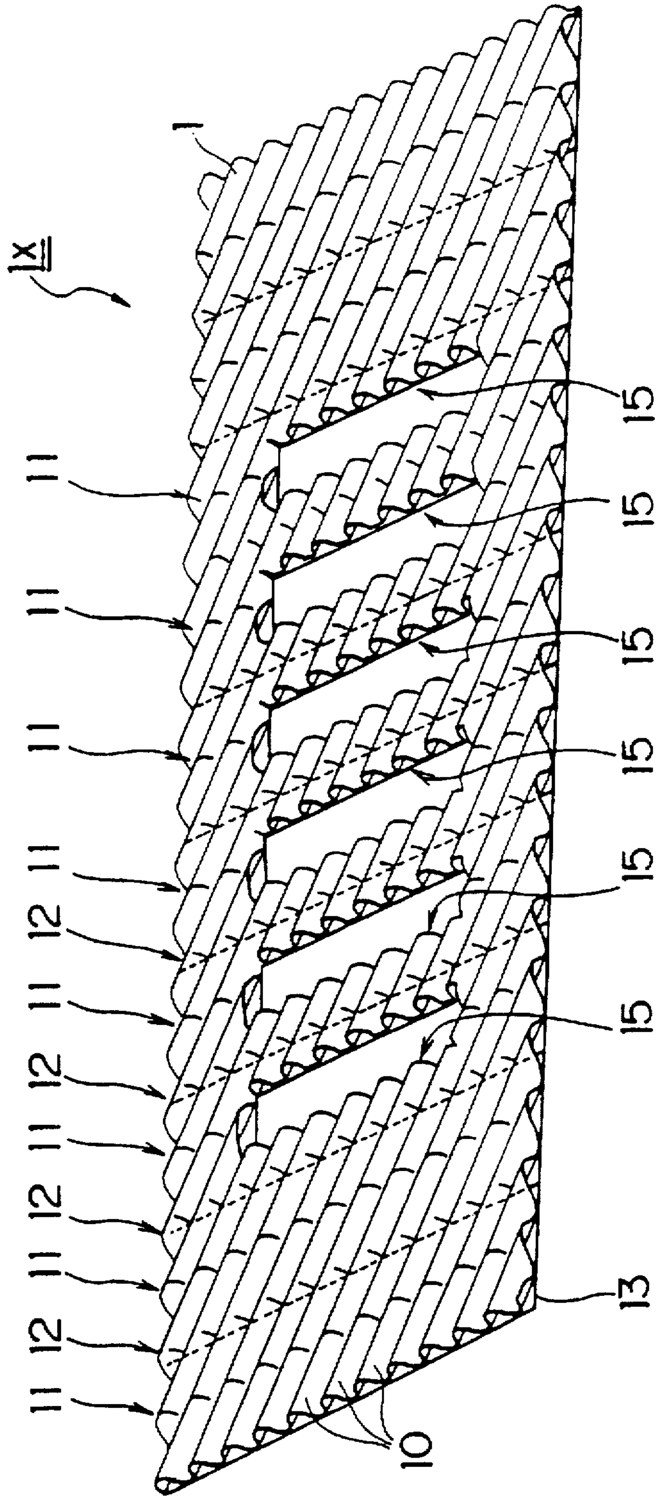
FIG. 33 is a perspective view of a base board for a layered corrugated fiberboard structure in a yet further embodiment according to the present invention.

FIG. 33 shows a base board for a layered corrugated fiberboard structure in a sixteenth embodiment according to the present invention.

A corrugated fiberboard material 1 for forming a base board 1*x* for a layered corrugated fiberboard structure in this embodiment is a single-faced corrugated fiberboard having a plurality of flutes 10 inclined to the length thereof.

A plurality of first folds and a plurality of second folds 12 along which the corrugated fiberboard material 1 is folded in opposite directions, respectively, are formed in the corrugated fiberboard material 1 alternately at fixed intervals in the cross direction.

The first folds 11 and the second folds 12 are substantially the same as the first folds 11 and the second folds 12 of the base board for the layered corrugated fiberboard structure in the first embodiment shown in FIG. 2, respectively. A plurality of holes 15 of the same size and the same shape are formed in portions near the middle portions of the corrugated fiberboard material 1 so as to extend across the folds 11 along which the corrugated fiberboard material is folded in the shape of the inverted letter V.

Figure 35:
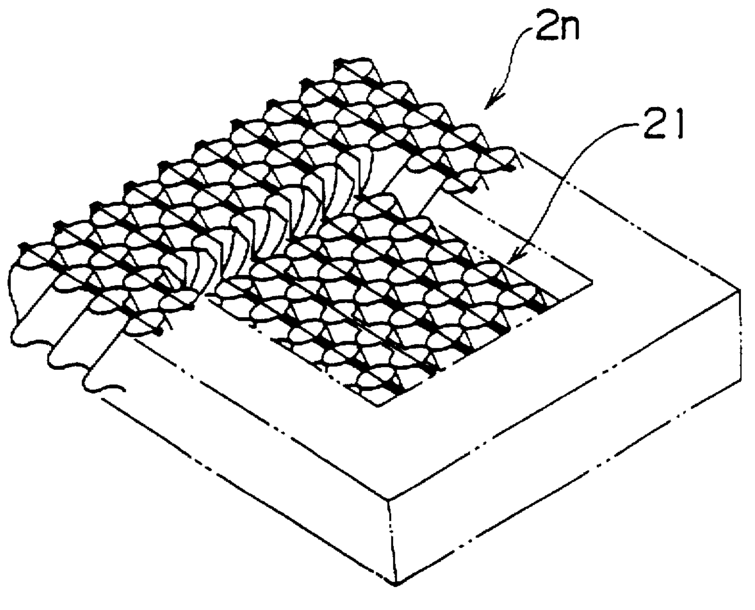
FIG. 35 is a perspective view of a layered corrugated fiberboard structure formed by folding the base board for the layered corrugated fiberboard structure of FIG. 33.

Since the base board 1x for the layered corrugated fiberboard structure in this embodiment is provided with the plurality of holes 15 as described above, a layered corrugated fiberboard structure 2n formed by folding the base board 1x in a zigzag shape has a parallelepipedic recess 21 and a shape generally resembling a box or a tray as shown in FIG. 35.

When the holes 15 shown in FIG. 33 are formed so as to extend across the second folds 12 in portions near the middle portions of the corrugated fiberboard material 1, the recess 21 is formed in the lower surface of the layered corrugated fiberboard structure 2n when the base board is folded. When the holes 15 are similarly formed in portions of all the first folds 11, a groove is formed through the layered corrugated fiberboard structure 2n.

The holes 15 may be formed in any suitable shape to form a recess or a protrusion of a desired shape in the upper and/or the lower surface of the layered corrugated fiberboard structure 2n.

The base boards in the other embodiments may be provided with holes like the holes 15 of the base board 1x in this embodiment to form layered corrugated fiberboard structures of desired shapes according to the patterns of the holes.

Seventeenth Embodiment

Figure 36:
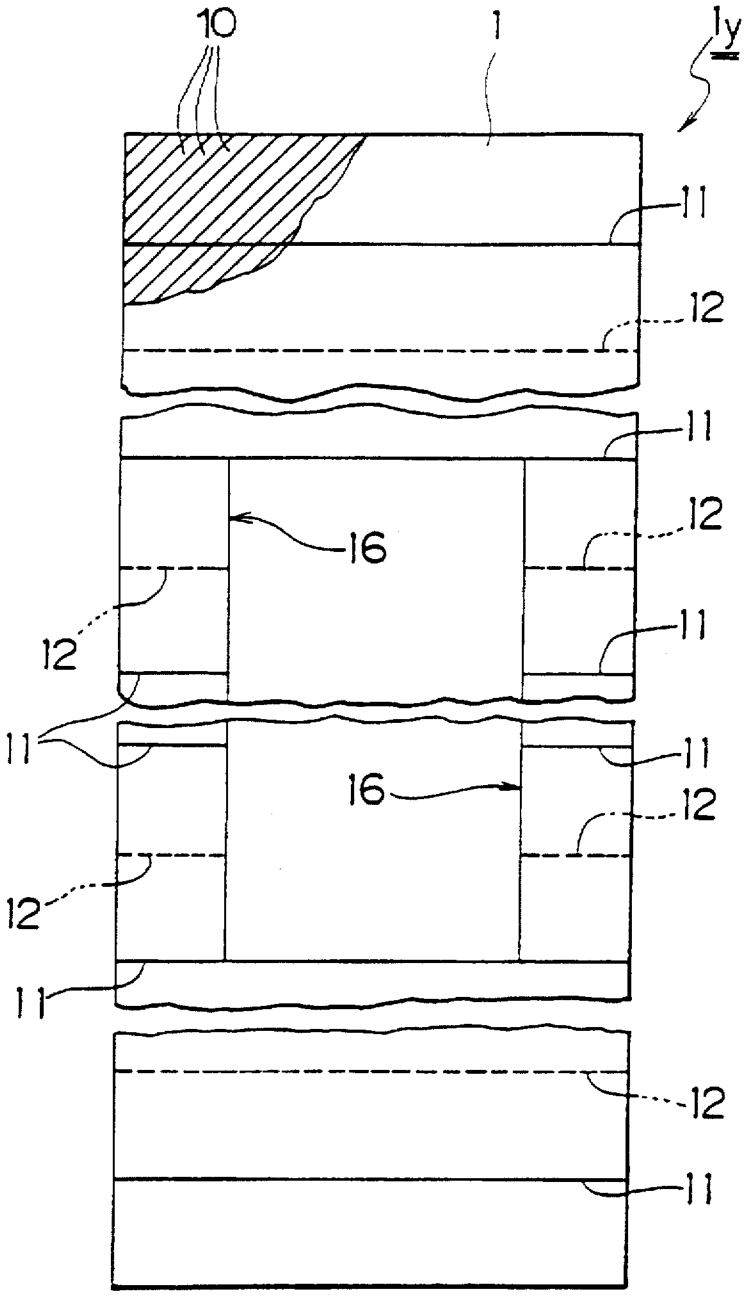
FIG. 36 is a fragmentary, partially cutaway plan view of a base board for a layered corrugated fiberboard structure in a yet further embodiment according to the present invention.

FIG. 36 shows a base board for a layered corrugated fiberboard structure in a seventeenth embodiment according to the present invention.

A corrugated fiberboard material 1 for forming a base board 1y for a layered corrugated fiberboard structure in this embodiment is a double-faced corrugated fiberboard having a plurality of flutes 10 inclined to the length thereof.

A plurality of first folds along which the corrugated fiberboard material 1 is folded in the shape of the inverted letter V and a plurality of second folds 12 along which the corrugated fiberboard material 1 is folded in the shape of the letter V are formed in the corrugated fiberboard material 1 alternately at fixed intervals and in parallel to each other. A rectangular hole 16 is formed in a portion near the central portion of the corrugated fiberboard material 1 so as to extend across some of the folds 11 and 12.

The first folds 11 and the second folds 12 are substantially the same as the folds 11 and 12 of the base board for the layered corrugated fiberboard structure in the first embodiment shown in FIG. 2.

Figure 38:
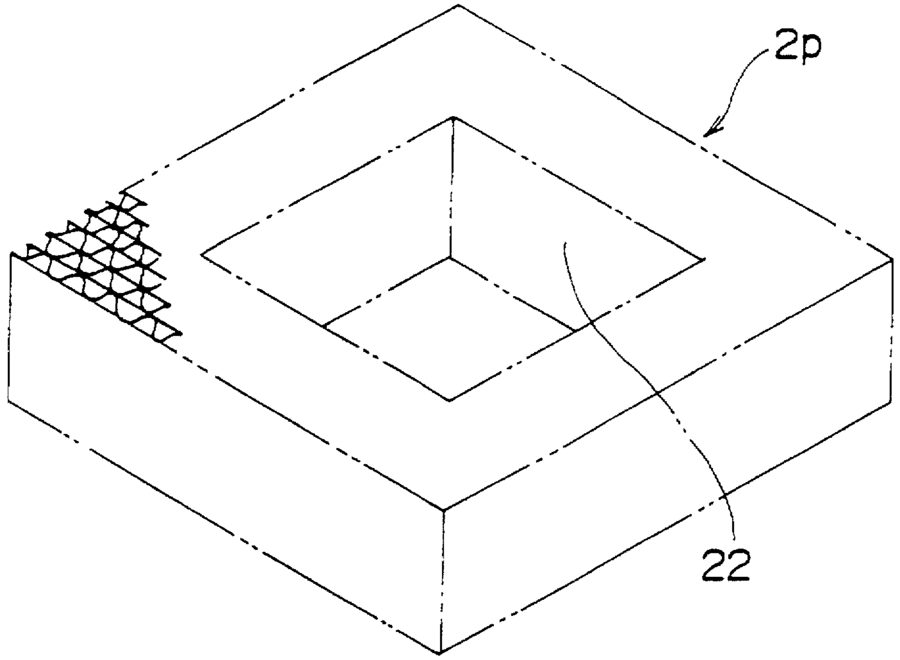
FIG. 38 is a perspective view of a layered corrugated fiberboard structure formed by folding the base board for the layered corrugated fiberboard structure of FIG. 36.

When the base board 1y for the layered corrugated fiberboard structure provided with the hole 16 as described above is folded in a zigzag shape, a layered corrugated fiberboard structure 2p having the shape of a generally parallelepipedic frame and a central through hole 22 as shown in FIG. 38 is formed.

The layered corrugated fiberboard structure is provided with a through hole of a desired shape is formed by selectively determining the shape of the hole 16.

The corrugated fiberboard materials 1 for the base boards for the layered corrugated fiberboard structure in the other embodiments may be provided with a hole like the hole 16 of the base board 1x in this embodiment to form a layered corrugated fiberboard structure provided with a through hole of a desired shape by varying the shape of the hole.

Eighteenth Embodiment

Figure 37:
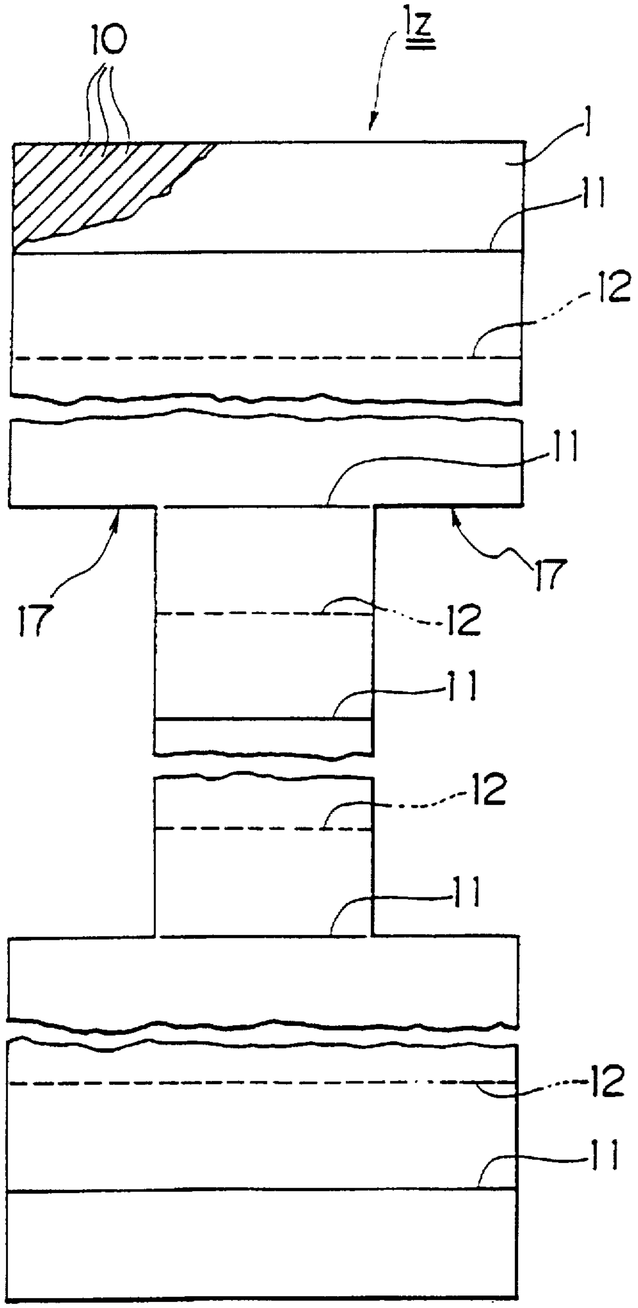
FIG. 37 is a fragmentary, partially cutaway plan view of a base board for a layered corrugated fiberboard structure in a yet further embodiment according to the present invention.

FIG. 37 shows a base board for a layered corrugated fiberboard structure in an eighteenth embodiment according to the present invention.

A corrugated fiberboard material 1 for forming a base board 1z for a layered corrugated fiberboard structure in this embodiment is a double-faced corrugated fiberboard having a plurality of flutes 10 inclined to the length thereof.

A plurality of first folds along which the corrugated fiberboard material 1 is folded in the shape of the inverted letter V and a plurality of second folds 12 along which the corrugated fiberboard material 1 is folded in the shape of the letter V are formed in the corrugated fiberboard material 1 alternately at fixed intervals and in parallel to each other. Rectangular recesses 17 are formed in portions near the middle portion of the corrugated fiberboard material 1 so as to extend across some folds 11 and 12, so that the width of the portion having the recesses 17 of the corrugated fiberboard material 1 is smaller than that of other portions of the corrugated fiberboard material 1.

The first folds 11 and the second folds 12 are substantially the same as the folds 11 and 12 of the base board for the layered corrugated fiberboard structure in the first embodiment shown in FIG. 2.

Figure 39:
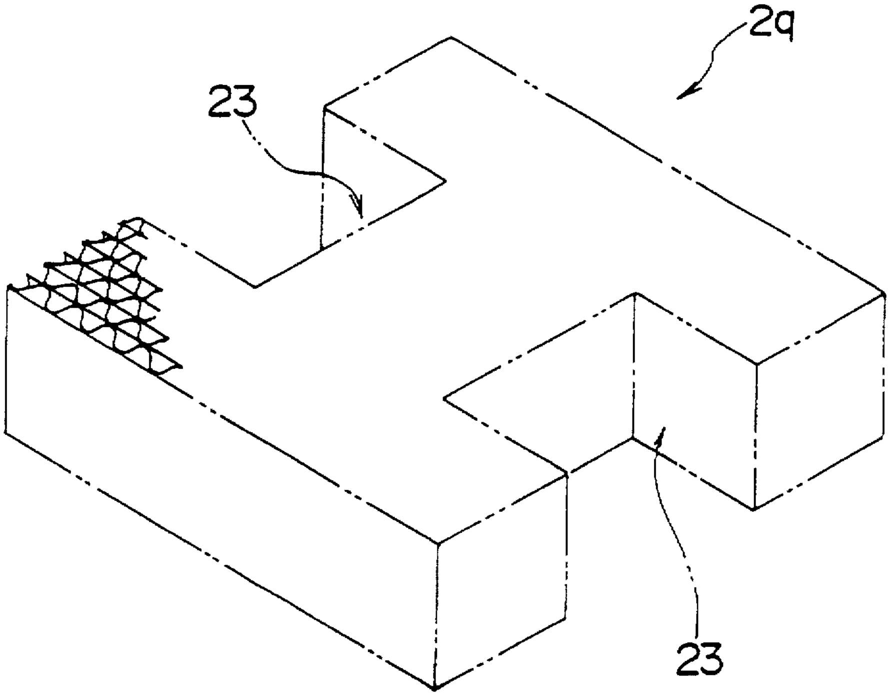
FIG. 39 is a perspective view of a layered corrugated fiberboard structure formed by folding the base board for the layered corrugated fiberboard structure of FIG. 37.

Since the base board 1z for the layered corrugated fiberboard structure is provided with the recesses 17, a layered corrugated fiberboard structure 2q formed by folding the base board 1z in a zigzag shape has parallelepipedic recesses 23 formed in the opposite side surfaces as shown in FIG. 39.

The layered corrugated fiberboard structure provided with recesses of a desired shape is formed by selectively determining the shape of the recesses 17.

The corrugated fiberboard material 1 for the base boards for the layered corrugated fiberboard structure in the other embodiments may be provided with recesses like the recesses 17 of the base board 1z in this embodiment to form a layered corrugated fiberboard structure provided with recesses of a desired shape by varying the shape of the recesses.

Nineteenth Embodiment

Figure 40:
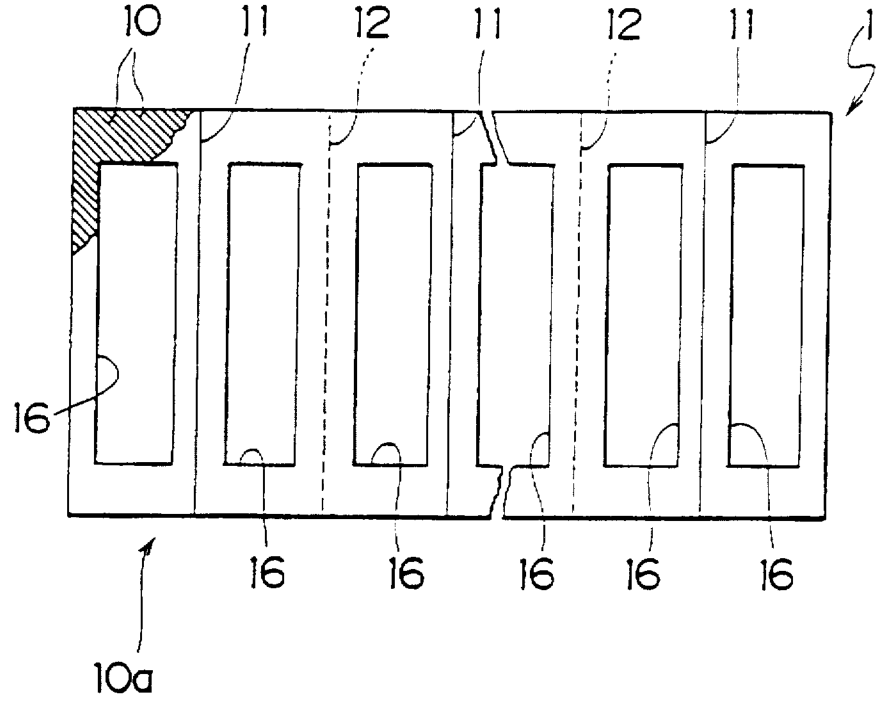
FIG. 40 is a fragmentary, partially cutaway plan view of a base board for a layered corrugated fiberboard structure in a yet further embodiment according to the present invention.

FIG. 40 shows a base board for a layered corrugated fiberboard structure in a nineteenth embodiment according to the present invention.

A corrugated fiberboard material 1 for a base board 10a for a layered corrugated fiberboard structure in this embodiment is a double-faced corrugated fiberboard having a plurality of flutes 10 inclined to the length thereof.

A plurality of first folds 11 and a plurality of second folds 12, which are similar to those of the base board for the layered corrugated fiberboard structure in the seventeenth embodiment, are formed in the corrugated fiberboard material 1 alternately in parallel to each other. Rectangular holes 16 of the same shape and the same size are formed in sections between the adjacent folds 11 and 12, respectively, of the corrugated fiberboard material 1 with their long sides extended along the width of the corrugated fiberboard material 1.

Figure 41:
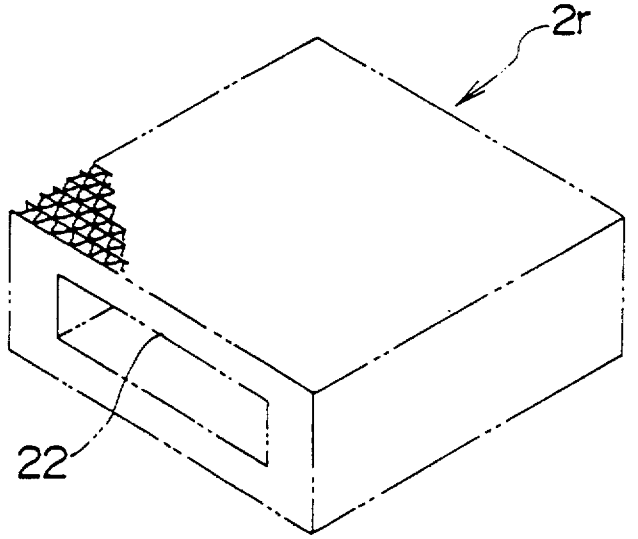
FIG. 41 is a perspective view of a layered corrugated fiberboard structure formed by folding the base board for the layered corrugated fiberboard structure of FIG. 40.
Figure 42:
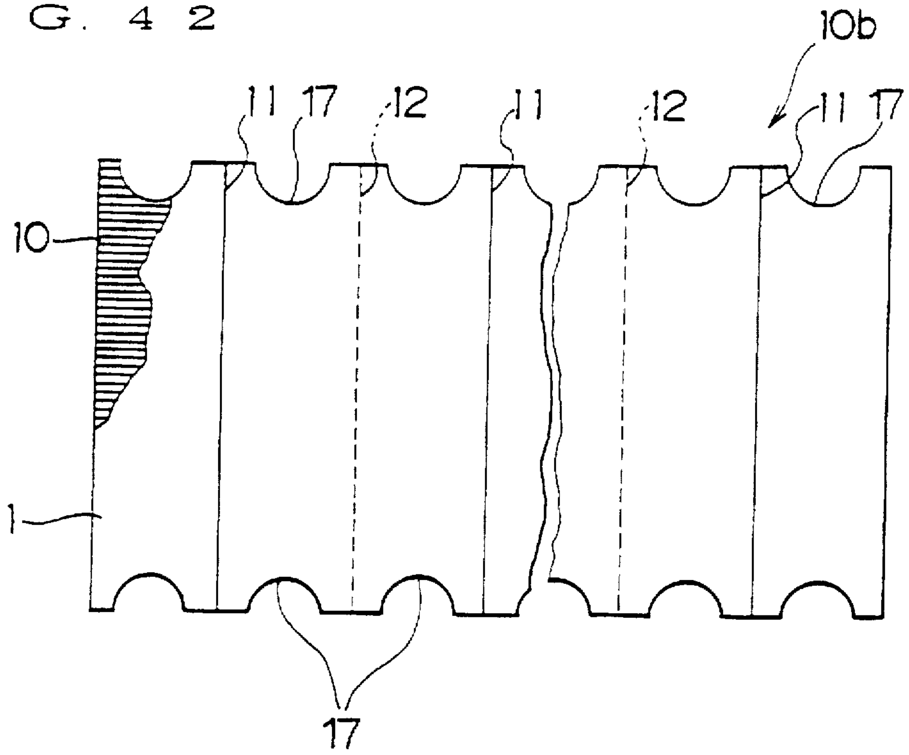
FIG. 42 is a fragmentary, partially cutaway plan view of a base board for a layered corrugated fiberboard structure in a yet further embodiment according to the present invention.

Since the base board 10a for the layered corrugated fiberboard structure is provided with the plurality of holes 16, a layered corrugated fiberboard structure 2r formed by folding the base board 10a in a zigzag shape has a parallelepipedic hole 22 extending across the opposite side surfaces and a shape generally resembling a rectangular cylinder as shown in FIG. 41.

Twentieth Embodiment

FIG. 41 shows a base board for a layered corrugated fiberboard structure in a twentieth embodiment according to the present invention.

A corrugated fiberboard material 1 for a base board 10*b* for a layered corrugated fiberboard structure in this embodiment is a double-faced corrugated fiberboard having a plurality of flutes 10 parallel to each other in the length direction.

A plurality of first folds 11 and a plurality of second folds 12, which are similar to those of the base board for the layered corrugated fiberboard structure in the seventeenth embodiment, are formed in the corrugated fiberboard material 1 alternately in parallel to each other. Recesses 17 of the same shape and the same size are formed in the opposite side edges of sections between the adjacent folds 11 and 12, respectively.

Figure 43:
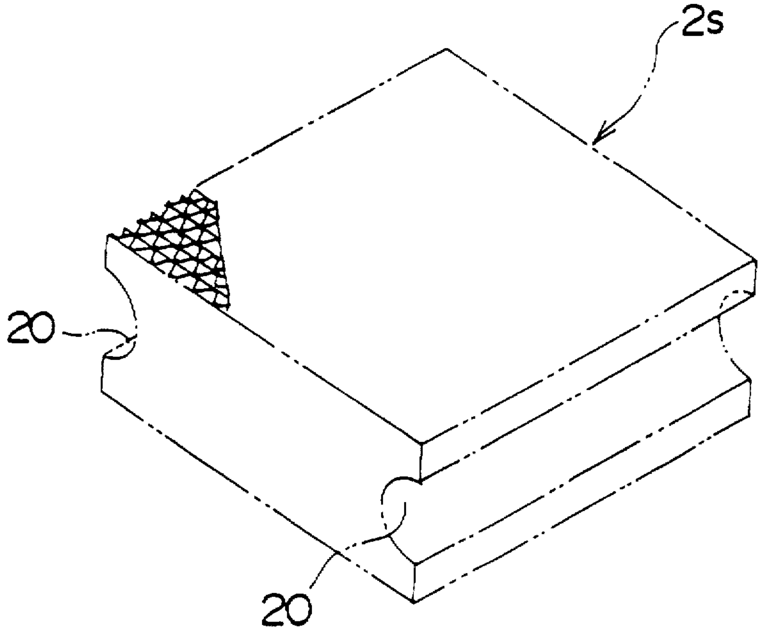
FIG. 43 is a perspective view of a layered corrugated fiberboard structure formed by folding the base board for the layered corrugated fiberboard structure of FIG. 42.

Since the base board 10*b* for the layered corrugated fiberboard structure is provided with the plurality recesses 17 as described above, a layered corrugated fiberboard structure 2*s* formed by folding the base board 10*b* in a zigzag shape has grooves 20 formed in the opposite side surfaces thereof as shown in FIG. 43.

Although the first folds 11 and the second folds of the base boards for the layered corrugated fiberboard structure in the fifteenth to twentieth embodiments are the same as those of the first embodiment, the first folds 11 and the second folds 12 may be the same as those of any one of the second to thirteenth embodiments.

Although only the embodiments employing corrugating mediums having flutes, single-faced corrugated fiberboards and double-faced corrugated fiberboards as the corrugated fiberboard materials have been described, base boards embodying the present invention employing double-wall corrugated fiberboards and triple-wall corrugated fiberboard are substantially the same as the base boards for the layered corrugated fiberboard structure in the embodiments employing the double-faced corrugated fiberboards, and hence, the description thereof will be omitted.

In the base board for the layered corrugated fiberboard structure in accordance with the present invention, although it is desirable that the folds 11 and 12 are extended substantially perpendicularly to the length of the corrugated fiberboard material 1, the folds 11 and 12 need not necessarily be extended perpendicularly to the length of the corrugated fiberboard material 1 according to the purposes of use.

CAPABILITY OF INDUSTRIAL UTILIZATION

According to the base board for the layered corrugated fiberboard structure in accordance with the present invention, portions corresponding to the second folds, along Which the corrugated fiberboard material is folded in the shape of the letter V, are strong enough to reuse the base board for the layered corrugated fiberboard structure.

When a load is applied to portions of the corrugated fiberboard material corresponding to the second folds to fold the corrugated fiberboard material along the second folds, the portions of the corrugated fiberboard material are not broken, and the second folds are smoothly formed.

I claim:

1. A base board for a layered corrugated fiberboard structure comprising:
   - a corrugated fiberboard material including a corrugating medium having flutes;
   - first folds along which the corrugated fiberboard material is folded in the shape of the inverted letter V; and
   - second folds along which the corrugated fiberboard material is folded in the shape of the letter V;
   - said first folds and said second folds being formed in said corrugated fiberboard material in parallel to each other and in an alternate arrangement so as to extend perpendicularly or at an angle other than a right angle to the flutes;
   - wherein said second folds are lines of perforations, and portions of the corrugated fiberboard material that forms an outer surface when the corrugated fiberboard material is folded are incised along the lines of perforations.

2. A base board for a layered corrugated fiberboard structure comprising:
   - a corrugated fiberboard material including a corrugating medium having flutes;
   - first folds along which the corrugated fiberboard material is folded in the shape of the inverted letter V; and
   - second folds along which the corrugated fiberboard material is folded in the shape of the letter V;
   - said first folds and said second folds being formed in said corrugated fiberboard material in parallel to each other and in an alternate arrangement so as to extend perpendicularly or at an angle other than a right angle to the flutes;
   - wherein the second folds are formed by alternately arranging hinge portions, which have a predetermined length and are formed by crushing portions of the flutes of the corrugated fiberboard material, and cut portions penetrating said corrugated fiberboard material, in portions of said corrugated fiberboard material in which the second folds are to be formed; and
   - auxiliary cut portions penetrating said corrugated fiberboard material and intersecting the cut portions at a predetermined angle are formed on the opposite sides of the opposite ends of said cut portions.

3. A base board for a layered corrugated fiberboard structure comprising:
   - a corrugated fiberboard material including a corrugating medium having flutes;
   - first folds along which the corrugated fiberboard material is folded in the shape of the inverted letter V; and
   - second folds along which the corrugated fiberboard material is folded in the shape of the letter V;
   - said first folds and said second folds being formed in said corrugated fiberboard material in parallel to each other and in an alternate arrangement so as to extend perpendicularly or at an angle other than a right angle to the flutes;
   - wherein said second folds are formed by alternately arranging hinge portions, which have a predetermined length and are formed by crushing portions of the flutes of the corrugated fiberboard material, and slits, which have a width smaller than the thickness of the corrugated fiberboard material and penetrate the corrugated fiberboard material, in portions of the corrugated fiberboard material in which said second holds are to be formed; and
   - auxiliary cut portions penetrating said corrugated fiberboard material and intersecting the slits at a predetermined angle are formed on the opposite sides of the opposite ends of said slits.

4. A base board for a layered corrugated fiberboard structure comprising:
   - a corrugated fiberboard material including a corrugating medium having flutes;
   - first folds along which the corrugated fiberboard material is folded in the shape of the inverted letter V; and
   - second folds along which the corrugated fiberboard material is folded in the shape of the letter V;

said first folds and said second folds being formed in said corrugated fiberboard material in parallel to each other and in an alternate arrangement so as to extend perpendicularly or at an angle other than a right angle to the flutes;

wherein said second folds are formed by alternately arranging hinge portions, which have a predetermined length and are formed by crushing portions of the flutes of the corrugated fiberboard material, and slits, which have a width greater than the thickness of the corrugated fiberboard material and penetrate the corrugated fiberboard material, in portions of the corrugated fiberboard material in which said second folds are to be formed.

5. A base board for a layered corrugated fiberboard structure according to claim 4, wherein the opposite ends of said slits in the cross direction are tapered toward said hinge portions.

6. A base board for a layered corrugated fiberboard structure comprising:

a corrugated fiberboard material including a corrugating medium having flutes;

first folds along which the corrugated fiberboard material is folded in the shape of the inverted letter V; and second folds along which the corrugated fiberboard material is folded in the shape of the letter V;

said first folds and said second folds being formed in said corrugated fiberboard material in parallel to each other and in an alternate arrangement so as to extend perpendicularly or at an angle other than a right angle to the flutes;

wherein said second folds are formed by arranging grooves, which have a substantially quadrangular cross section of a width about twice the thickness of the corrugated fiberboard material, on the side of the corrugated fiberboard material that forms an inner surface when said corrugated fiberboard material is folded.

7. A base board for a layered corrugated fiberboard structure according to claim 6, wherein each of the grooves forming said second folds has opposite side surfaces formed by cutting said corrugated fiberboard material in the thickness direction and a bottom surface formed by crushing a portion of the corrugated fiberboard material between the opposite side surfaces.

8. A base board for a layered corrugated fiberboard structure according to claim 1 wherein said corrugated fiberboard material is a corrugating medium having flutes and said first folds are formed by cutting portions of the corrugated fiberboard material other than hinge portions formed to be continuous to tip portions of the flutes that form an inner surface of the corrugated fiberboard material when the corrugated fiberboard material is folded.

9. A base board for a layered corrugated fiberboard structure according to claim 1 wherein said corrugated fiberboard material is a single-faced corrugated fiberboard, and said first folds are formed by cutting portions of the corrugated fiberboard material other than at least a linerboard of the corrugated fiberboard material or hinge portions formed to be continuous to tip portions of the flutes not covered with the linerboard.

10. A base board for a layered corrugated fiberboard structure according to claim 1 wherein said corrugated fiberboard material is a double-faced corrugated fiberboard, a double-wall corrugated fiberboard or a triple-wall corrugated fiberboard, and said first folds are formed by cutting portions of the corrugated fiberboard material other than at least hinge portions formed to be continuous to portions of a linerboard on the side that forms an inner surface of the corrugated fiberboard material when the corrugated fiberboard material is folded.

11. A base board for a layered corrugated fiberboard structure according to claim 1 wherein said corrugated fiberboard material has flutes extending along the length thereof or flutes inclined at an angle other than a right angle to the length thereof, and said folds are formed in the cross direction of the corrugated fiberboard material.

12. A base board for a layered corrugated fiberboard structure according to claim 1 wherein said corrugated fiberboard material is provided with holes at suitable positions.

13. A base board for a layered corrugated fiberboard structure according to claim 1 wherein the width of said corrugated fiberboard material varies in each portion in the length direction.

14. A base board for a layered corrugated fiberboard structure according to claim 1 wherein said folds are arranged at equal intervals.

15. A base board for a layered corrugated fiberboard structure according to claim 1 wherein said folds are arranged at irregular intervals.

16. A base board for a layered corrugated fiberboard structure according to claim 2 wherein said corrugated fiberboard material is a corrugating medium having flutes and said first folds are formed by cutting portions of the corrugated fiberboard material other than hinge portions formed to be continuous to tip portions of the flutes that form an inner surface of the corrugated fiberboard material when the corrugated fiberboard material is folded.

17. A base board for a layered corrugated fiberboard structure according to claim 3 wherein said corrugated fiberboard material is a corrugating medium having flutes and said first folds are formed by cutting portions of the corrugated fiberboard material other than hinge portions formed to be continuous to tip portions of the flutes that form an inner surface of the corrugated fiberboard material when the corrugated fiberboard material is folded.

18. A base board for a layered corrugated fiberboard structure according to claim 4 wherein said corrugated fiberboard material is a corrugating medium having flutes and said first folds are formed by cutting portions of the corrugated fiberboard material other than hinge portions formed to be continuous to tip portions of the flutes that form an inner surface of the corrugated fiberboard material when the corrugated fiberboard material is folded.

19. A base board for a layered corrugated fiberboard structure according to claim 6 wherein said corrugated fiberboard material is a corrugating medium having flutes and said first folds are formed by cutting portions of the corrugated fiberboard material other than hinge portions formed to be continuous to tip portions of the flutes that form an inner surface of the corrugated fiberboard material when the corrugated fiberboard material is folded.

20. A base board for a layered corrugated fiberboard structure according to claim 2 wherein said corrugated fiberboard material is a single-faced corrugated fiberboard, and said first folds are formed by cutting portions of the corrugated fiberboard material other than at least a linerboard of the corrugated fiberboard material or hinge portions formed to be continuous to tip portions of the flutes not covered with the linerboard.

21. A base board for a layered corrugated fiberboard structure according to claim 3 wherein said corrugated fiberboard material is a single-faced corrugated fiberboard, and said first folds are formed by cutting portions of the corrugated fiberboard material other than at least a linerboard of the corrugated fiberboard material or hinge portions formed to be continuous to tip portions of the flutes not covered with the linerboard.

22. A base board for a layered corrugated fiberboard structure according to claim 4 wherein said corrugated fiberboard material is a single-faced corrugated fiberboard, and said first folds are formed by cutting portions of the corrugated fiberboard material other than at least a linerboard of the corrugated fiberboard material or hinge portions formed to be continuous to tip portions of the flutes not covered with the linerboard.

23. A base board for a layered corrugated fiberboard structure according to claim 6 wherein said corrugated fiberboard material is a single-faced corrugated fiberboard, and said first folds are formed by cutting portions of the corrugated fiberboard material other than at least a linerboard of the corrugated fiberboard material or hinge portions formed to be continuous to tip portions of the flutes not covered with the linerboard.

24. A base board for a layered corrugated fiberboard structure according to claim 2 wherein said corrugated fiberboard material is a double-faced corrugated fiberboard, a double-wall corrugated fiberboard or a triple-wall corrugated fiberboard, and said first folds are formed by cutting portions of the corrugated fiberboard material other than at least hinge portions formed to be continuous to portions of a linerboard on the side that forms an inner surface of the corrugated fiberboard material when the corrugated fiberboard material is folded.

25. A base board for a layered corrugated fiberboard structure according to claim 3 wherein said corrugated fiberboard material is a double-faced corrugated fiberboard, a double-wall corrugated fiberboard or a triple-wall corrugated fiberboard, and said first folds are formed by cutting portions of the corrugated fiberboard material other than at least hinge portions formed to be continuous to portions of a linerboard on the side that forms an inner surface of the corrugated fiberboard material when the corrugated fiberboard material is folded.

26. A base board for a layered corrugated fiberboard structure according to claim 4 wherein said corrugated fiberboard material is a double-faced corrugated fiberboard, a double-wall corrugated fiberboard or a triple-wall corrugated fiberboard, and said first folds are formed by cutting portions of the corrugated fiberboard material other than at least hinge portions formed to be continuous to portions of a linerboard on the side that forms an inner surface of the corrugated fiberboard material when the corrugated fiberboard material is folded.

27. A base board for a layered corrugated fiberboard structure according to claim 6 wherein said corrugated fiberboard material is a double-faced corrugated fiberboard, a double-wall corrugated fiberboard or a triple-wall corrugated fiberboard, and said first folds are formed by cutting portions of the corrugated fiberboard material other than at least hinge portions formed to be continuous to portions of a linerboard on the side that forms an inner surface of the corrugated fiberboard material when the corrugated fiberboard material is folded.

28. A base board for a layered corrugated fiberboard structure according to claim 2 wherein said corrugated fiberboard material has flutes extending along the length thereof or flutes inclined at an angle other than a right angle to the length thereof, and said folds are formed in the cross direction of the corrugated fiberboard material.

29. A base board for a layered corrugated fiberboard structure according to claim 3 wherein said corrugated fiberboard material has flutes extending along the length thereof or flutes inclined at an angle other than a right angle to the length thereof, and said folds are formed in the cross direction of the corrugated fiberboard material.

30. A base board for a layered corrugated fiberboard structure according to claim 4 wherein said corrugated fiberboard material has flutes extending along the length thereof or flutes inclined at an angle other than a right angle to the length thereof, and said folds are formed in the cross direction of the corrugated fiberboard material.

31. A base board for a layered corrugated fiberboard structure according to claim 6 wherein said corrugated fiberboard material has flutes extending along the length thereof or flutes inclined at an angle other than a right angle to the length thereof, and said folds are formed in the cross direction of the corrugated fiberboard material.

32. A base board for a layered corrugated fiberboard structure according to claim 2 wherein said corrugated fiberboard material is provided with holes at suitable positions.

33. A base board for a layered corrugated fiberboard structure according to claim 3 wherein said corrugated fiberboard material is provided with holes at suitable positions.

34. A base board for a layered corrugated fiberboard structure according to claim 4 wherein said corrugated fiberboard material is provided with holes at suitable positions.

35. A base board for a layered corrugated fiberboard structure according to claim 6 wherein said corrugated fiberboard material is provided with holes at suitable positions.

36. A base board for a layered corrugated fiberboard structure according to claim 2 wherein the width of said corrugated fiberboard material varies in each portion in the length direction.

37. A base board for a layered corrugated fiberboard structure according to claim 3 wherein the width of said corrugated fiberboard material varies in each portion in the length direction.

38. A base board for a layered corrugated fiberboard structure according to claim 4 wherein the width of said corrugated fiberboard material varies in each portion in the length direction.

39. A base board for a layered corrugated fiberboard structure according to claim 6 wherein the width of said corrugated fiberboard material varies in each portion in the length direction.

40. A base board for a layered corrugated fiberboard structure according to claim 2 wherein said folds are arranged at equal intervals.

41. A base board for a layered corrugated fiberboard structure according to claim 3 wherein said folds are arranged at equal intervals.

42. A base board for a layered corrugated fiberboard structure according to claim 4 wherein said folds are arranged at equal intervals.

43. A base board for a layered corrugated fiberboard structure according to claim 6 wherein said folds are arranged at equal intervals.

44. A base board for a layered corrugated fiberboard structure according to claim 2 wherein said folds are arranged at irregular intervals.

45. A base board for a layered corrugated fiberboard structure according to claim 3 wherein said folds are arranged at irregular intervals.

46. A base board for a layered corrugated fiberboard structure according to claim 4 wherein said folds are arranged at irregular intervals.

47. A base board for a layered corrugated fiberboard structure according to claim 6 wherein said folds are arranged at irregular intervals.

* * * * *